(12) United States Patent
Kimura

(10) Patent No.: US 10,235,398 B2
(45) Date of Patent: Mar. 19, 2019

(54) PROCESSOR AND DATA GATHERING METHOD

(71) Applicant: Renesas Electronics Corporation, Kawasaki-shi, Kanagawa (JP)

(72) Inventor: Masayuki Kimura, Kanagawa (JP)

(73) Assignee: Renesas Electronics Corporation, Tokyo ( * ) Notice: Subject to any disclaimer, the term of this patent is extended or adjusted under 35 U.S.C. 154(b) by 402 days.

(21) Appl. No.: 14/694,026

(22) Filed: Apr. 23, 2015

(65) Prior Publication Data

US 2015/0347475 A1 Dec. 3, 2015

(30) Foreign Application Priority Data

May 27, 2014 (JP) .................. 2014-108852

(51) Int. Cl.
| | |
|---|---|
| *G06F 7/00* | (2006.01) |
| *G06F 17/30* | (2006.01) |
| *G06F 12/0802* | (2016.01) |
| *G06F 9/30* | (2018.01) |

(52) U.S. Cl.
CPC .... *G06F 17/30306* (2013.01); *G06F 9/30032* (2013.01); *G06F 9/30036* (2013.01); *G06F 9/30043* (2013.01); *G06F 9/30109* (2013.01); *G06F 9/30141* (2013.01); *G06F 12/0802* (2013.01); *G06F 17/30982* (2013.01); *G06F 2212/1044* (2013.01); *G06F 2212/163* (2013.01)

(58) Field of Classification Search
CPC ......... G06F 17/30306; G06F 17/30982; G06F 12/0802; G06F 9/30032

USPC .................. 707/752, 753, 999.007, 999.01
See application file for complete search history.

(56) References Cited

U.S. PATENT DOCUMENTS

| | | | |
|---|---|---|---|
| 5,226,135 A | * | 7/1993 | Mishina .............. G06F 15/8053 712/7 |
| 8,422,330 B2 | | 4/2013 | Hatano et al. |
| 8,972,698 B2 | | 3/2015 | Hughes et al. |

(Continued)

FOREIGN PATENT DOCUMENTS

| | | |
|---|---|---|
| JP | 2011-002908 A | 1/2011 |
| JP | 2012-137839 A | 7/2012 |

(Continued)

OTHER PUBLICATIONS

Office Action dated Jul. 4, 2017, in Japanese Application No. 2014-108852.

(Continued)

*Primary Examiner* — Md I Uddin
(74) *Attorney, Agent, or Firm* — Shapiro, Gabor and Rosenberger, PLLC

(57) ABSTRACT

An object of the present invention is to efficiently perform a data load process or a data store process between a memory and a storage unit in a processor. The processor includes: a plurality of storage units associated with a plurality of data elements included in a data set; and a control unit that reads the plurality of data elements stored in adjacent storage areas from a memory, in which a plurality of the data sets is stored, collectively for respective data sets, sorts the respective read data elements to a storage unit corresponding to the data element among the plurality of storage units, and writes the data elements to the respective data sets.

7 Claims, 18 Drawing Sheets

(56) References Cited

U.S. PATENT DOCUMENTS

2010/0318766 A1    12/2010  Tsuji
2012/0209855 A1*   8/2012   Shinjo .............. G06F 17/30625
                                                            707/745
2015/0026500 A1*   1/2015   Muff .................... G06F 1/3287
                                                            713/324

FOREIGN PATENT DOCUMENTS

JP       2014-504418 T     2/2014
WO    WO 2007/103195 A2    9/2007

OTHER PUBLICATIONS

European Search Report dated Jun. 22, 2017, in European Application No. 15167062.7.
Extended European Search Report dated Oct. 30, 2015, in European Application No. 15167062.7.
Office Action dated Jan. 18, 2018, in European Patent Application No. 15167062.7.

\* cited by examiner

PROCESSOR AND DATA GATHERING METHOD

CROSS-REFERENCE TO RELATED APPLICATIONS

This application is based upon and claims the benefit of priority from Japanese patent application No. 2014-108852, filed on May 27, 2014, the disclosure of which is incorporated herein in its entirety by reference.

BACKGROUND

The present invention relates to a processor and a data gathering method, and for example, relates to a processor, a data processing device, a data gathering method, and a data writing method for reading or writing a plurality of data sets stored in a memory.

In recent years, processors capable of executing vector operations have been developed. A vector operation performs a plurality of scalar operations as one operation on vector data elements. Published Japanese Translation of PCT International Publication for Patent Application, No. 2014-504418 discloses a gather instruction and a scatter instruction executed before and after a vector operation is performed.

A gather instruction is an instruction for gathering data values corresponding to a plurality of designated indices of a data array from corresponding areas of a memory. The plurality of data values gathered by the gather instruction is used as an input vector of a subsequent vector operation. A scatter instruction is an instruction for storing data values of vector data in areas of a memory corresponding to designated indices of a data array. The respective elements of the output vector generated by a vector operation can be used as the vector data that is subject to the scatter instruction.

SUMMARY

However, when the gather or scatter instruction is used for the vector operation, processing time may increase and processing efficiency may decrease. This is because only continuous areas of a memory in which a data array is stored can be accessed in one memory access. Due to this, the memory areas in the storage destination of the plurality of memory access target data values are discontinuous (discrete), memory access needs to be performed in respective clusters of continuous areas. That is, although the gather and scatter instructions each are single instructions, the number of memory accesses may increase depending on the storage destination of the data value. Due to this, the preprocessing or post-processing time for the vector operation increases.

Other objects and new features will become apparent from the description of the present specification and the accompanying drawings.

According to an embodiment of the present invention, a processor loads or stores a plurality of data elements included in a plurality of data sets between a memory and a storage unit in a processor by changing the storage order of the data elements.

A method and a system with which the processor according to the embodiment is replaced, a program for causing a computer to execute the process of the device or a portion of the device, an imaging apparatus including the device, and the like are also effective as aspects of the present invention.

According to the embodiment, the process of loading or storing data between the memory and the storage unit in the processor can be performed efficiently.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, specific embodiments to which means for solving the above problems are employed will be described in detail with reference to the drawings. In the respective drawings, components having the same function are denoted by the same reference symbols, and redundant description thereof will be omitted as appropriate for the clarity of the explanation.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, an application example, details, or a supplementary explanation thereof. Moreover, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Embodiment 1

Figure 1:
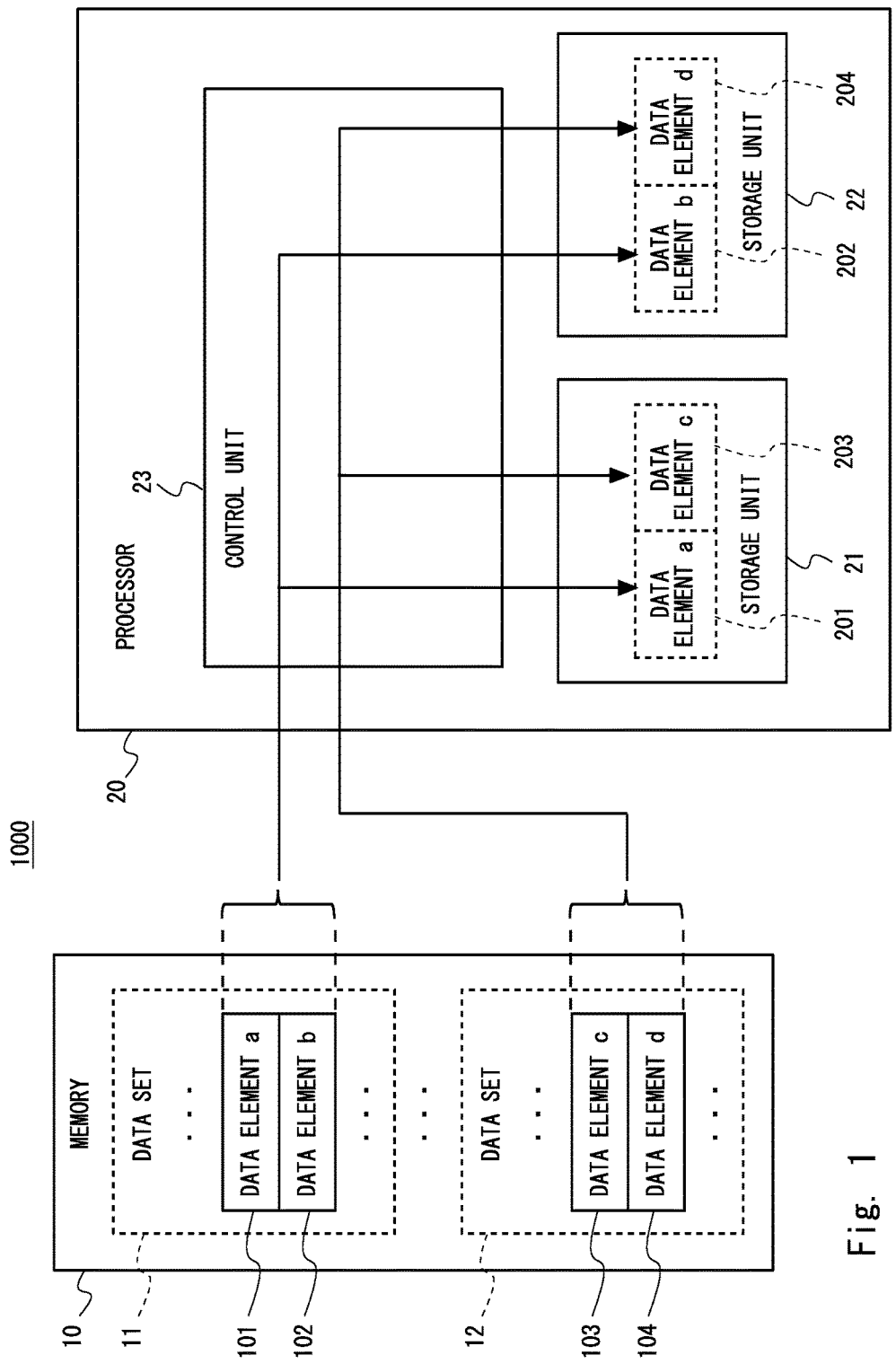
FIG. 1 is a block diagram illustrating a configuration of a data processing device including a processor according to Embodiment 1.

FIG. 1 is a block diagram illustrating a configuration of a data processing device 1000 including a processor 20 according to Embodiment 1. The data processing device 1000 includes a memory 10 and the processor 20. The memory 10 is a storage device in which data sets 11 and 12 and the like are stored. The memory 10 corresponds to a so-called main storage device and is present outside the processor 20. The memory 10 is connected to the processor 20 by a memory bus (not illustrated).

The data set 11 includes a plurality of data elements such as data element a 101 and data element b 102. Here, it is assumed that the data element a 101 and the data element b 102 are stored in adjacent storage areas in the memory 10. Moreover, the data set 12 includes a plurality of data elements such as data element c 103 and data element d 104. Here, it is assumed that the data element c 103 and the data element d 104 are stored in adjacent storage areas in the memory 10.

The processor 20 includes a storage unit 21, a storage unit 22, and a control unit 23. The storage units 21 and 22 are storage devices such as a register, a cache memory, or a buffer. The storage unit 21 is divided into at least areas 201 and 203. The storage unit 21 is associated with the data element a 101 and the data element c 103. Moreover, the storage unit 22 is divided into at least areas 202 and 204. The storage unit 22 is associated with the data element b 102 and the data element d 104.

The control unit 23 reads the plurality of data elements stored in the adjacent storage areas from the memory 10 collectively for each data set. Here, "reads . . . collectively" corresponds to reading a plurality of words in one memory access process from the control unit 23 to the memory 10. For example, in one memory access process, the control unit 23 reads the data element a 101 and the data element b 102 included in the data set 11 from the memory 10. In another memory access process, the control unit 23 reads the data element c 103 and the data element d 104 included in the data set 12 from the memory 10.

The control unit 23 sorts the read data elements to a storage unit corresponding to the data element among the plurality of storage units 21 and 22 and writes the data elements to respective data sets. For example, the control unit 23 sorts and writes the data element a 101 and the data element b 102 read for the data set 11 to the storage units 21 and 22, respectively. Moreover, the control unit 23 sorts and writes the data element c 103 and the data element d 104 read for the data set 12 to the storage units 21 and 22, respectively.

Figure 2:
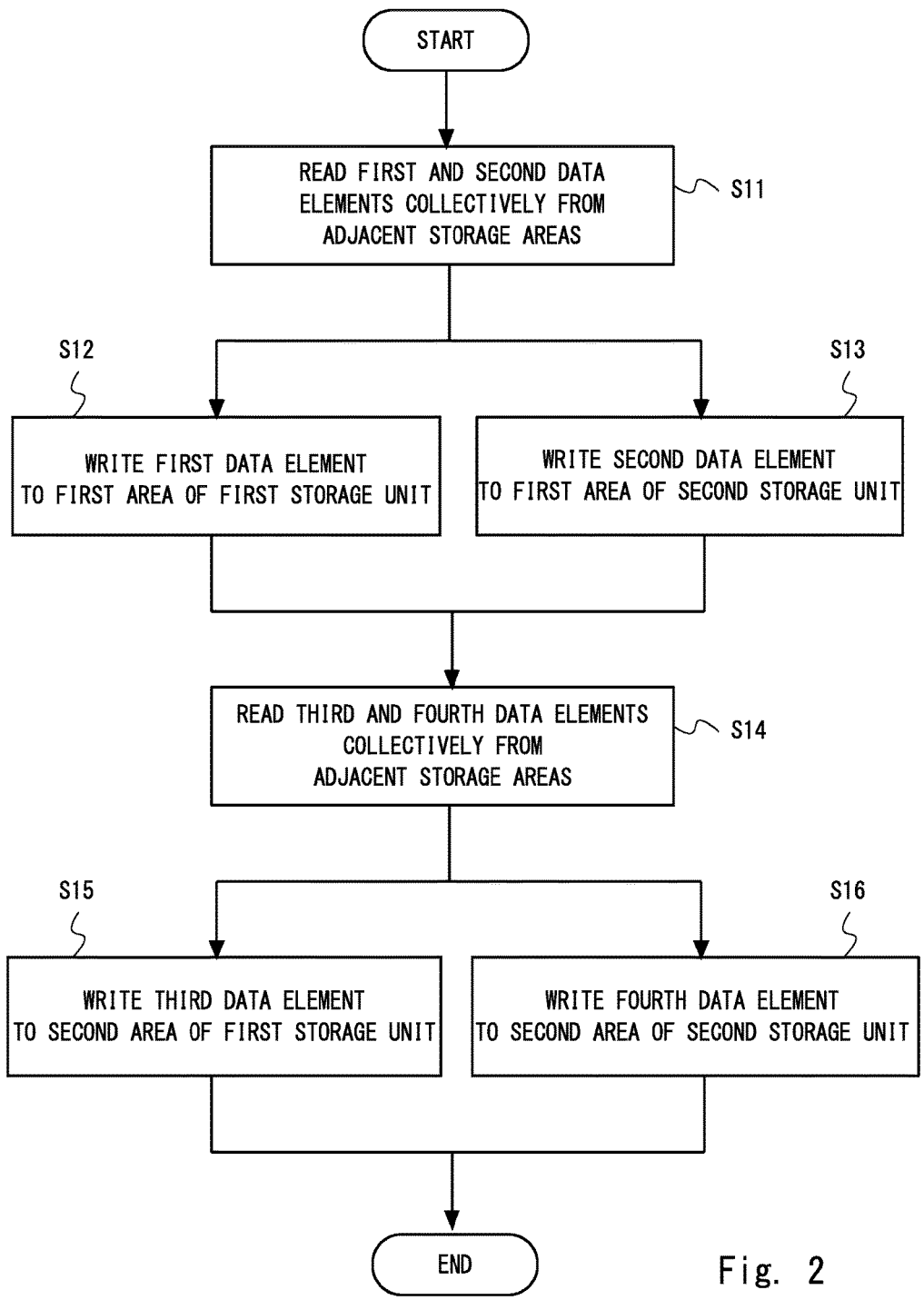
FIG. 2 is a flowchart illustrating the flow of the processes of a data gathering method according to Embodiment 1.

FIG. 2 is a flowchart illustrating the flow of the processes of a data gathering method according to Embodiment 1. First, the control unit 23 of the processor 20 reads first and second data elements (for example, the data element a 101 and the data element b 102) stored in adjacent areas of the memory 10 collectively from the memory 10 (S11).

Subsequently, the control unit 23 writes the read first data element to a first area (for example, the area 201) of a first storage unit (for example, the storage unit 21) (S12). Moreover, the control unit 23 writes the read second data element to a first area (for example, the area 202) of a second storage unit (for example, the storage unit 22) (S13). The area 202 may be an area corresponding to the area 201. Moreover, the control unit 23 may write the read second data element to the area 204 of the storage unit 22.

Subsequently, the control unit 23 reads third and fourth data elements (for example, the data element c 103 and the data element d 104) stored in adjacent areas of the memory 10 collectively from the memory 10 (S14).

The control unit 23 writes the read third data element to a second area (for example, the area 203) of the first storage unit (S15). Moreover, the control unit 23 writes the read fourth data element to a second area (for example, the area 204) of the second storage unit (S16). The area 204 may be an area corresponding to the area 203. Here, the control unit 23 may write the read third data element in an area other than the area to which data has been written at least in step S12 among the area of the first storage unit. Similarly, the control unit 23 may write the read fourth data element to an area other than the area to which data has been written at least in step S13 among the areas of the second storage unit.

Figure 3:
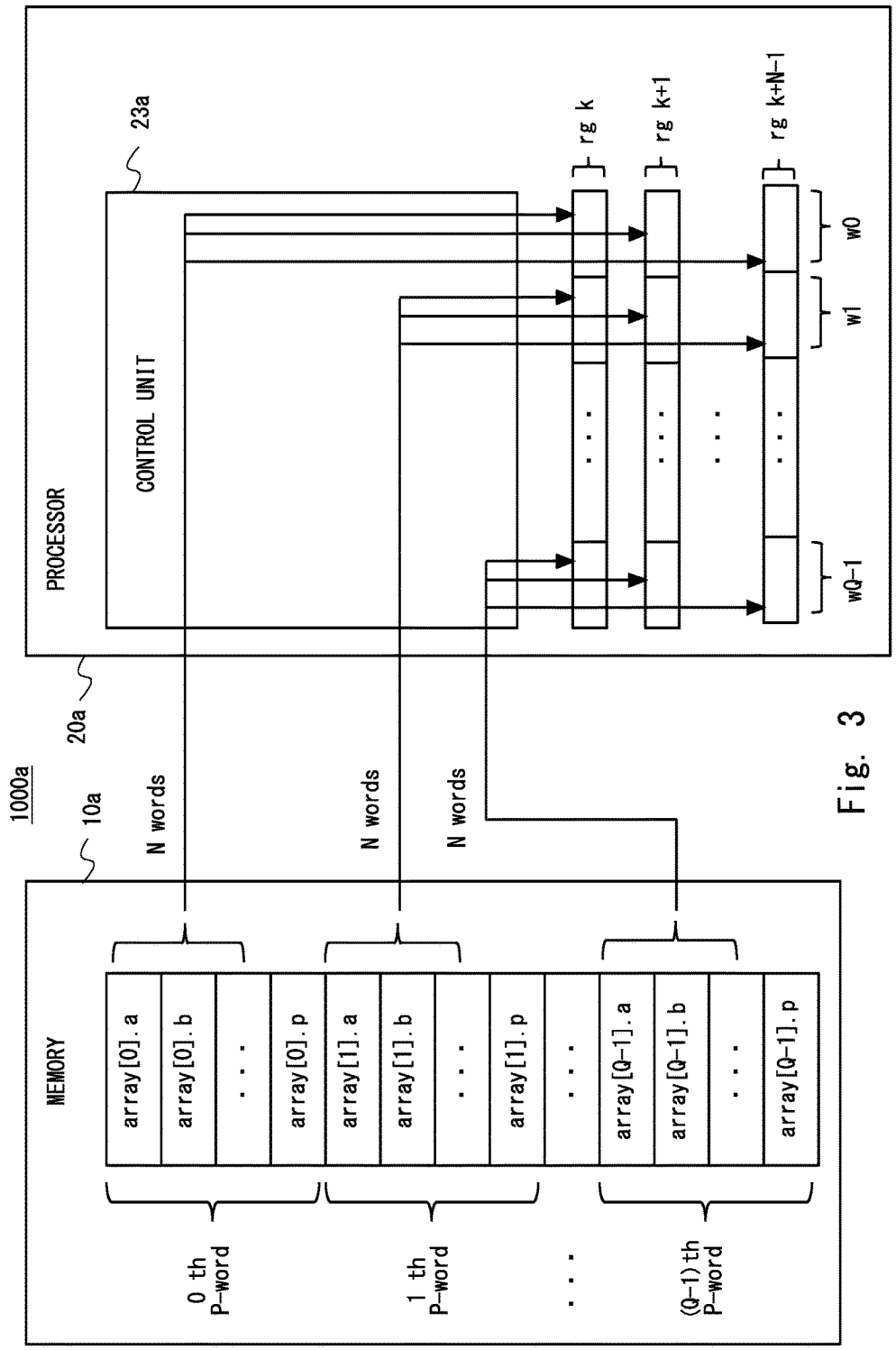
FIG. 3 is a block diagram illustrating another configuration of a data processing device including the processor according to Embodiment 1.

FIG. 3 is a block diagram illustrating a configuration of a data processing device 1000a including a processor 20a according to Embodiment 1. The processor 20a is used when the configuration of the processor 20 of FIG. 1 is applied to a case in which N words (N is a natural number of 2 or more) are read collectively from each of three or more data sets and areas of storage destination storage units are associated as ways. Q data arrays (array[0] to array[Q-1]) (Q is a natural number of 2 or more) are stored in a memory 10a. Each data array includes data elements a, b, and p.

The processor 20a includes a control unit 23a and registers $rg_k$, $rg_{k+1}$, . . . , and $rg_{k+N-1}$ (k is a natural number and N is a natural number of 2 or more). Here, it is assumed that each of the registers $rg_k$ to $rg_{k+N-1}$ is divided into a plurality of ways w0, w1, . . . , and wQ-1 which are areas, and the same ways of the respective registers correspond to each other. The processor 20a reads N words collectively from a data array array[0] and writes the respective data elements to the way w0 of the respective registers $rg_k$ to $rg_{k+N-1}$. Moreover, the processor 20a reads N words collectively from a data array array[1] and writes the respective data elements to the way w1 of the registers $rg_k$ to $rg_{k+N-1}$. The processor 20a performs the same processes on data arrays array[2] to array[Q-1]. For example, the processor 20a reads N words collectively from the data array array[Q-1] and writes the respective data elements to the way wQ-1 of the respective registers $rg_k$ to $rg_{k+N-1}$.

In this way, according to Embodiment 1, when gathering a plurality of data groups stored in discontinuous areas of the memory 10, such as, for example, a group formed by the data element a 101 and the data element c 103 and a group formed by the data element b 102 and the data element d 104, the time required for a data loading process can be reduced. This is because the results of accessing continuous (adjacent) memory areas are sorted and stored in the first and second storage units in the processor, and it is therefore not necessary to perform memory accesses individually. Moreover, since the read data groups are sorted and stored to the corresponding storage units, it is not necessary to execute a process of rearranging the read data groups additionally. Thus, the process of loading data between the memory and the storage unit in the processor can be performed efficiently.

Embodiment 2

Figure 4:
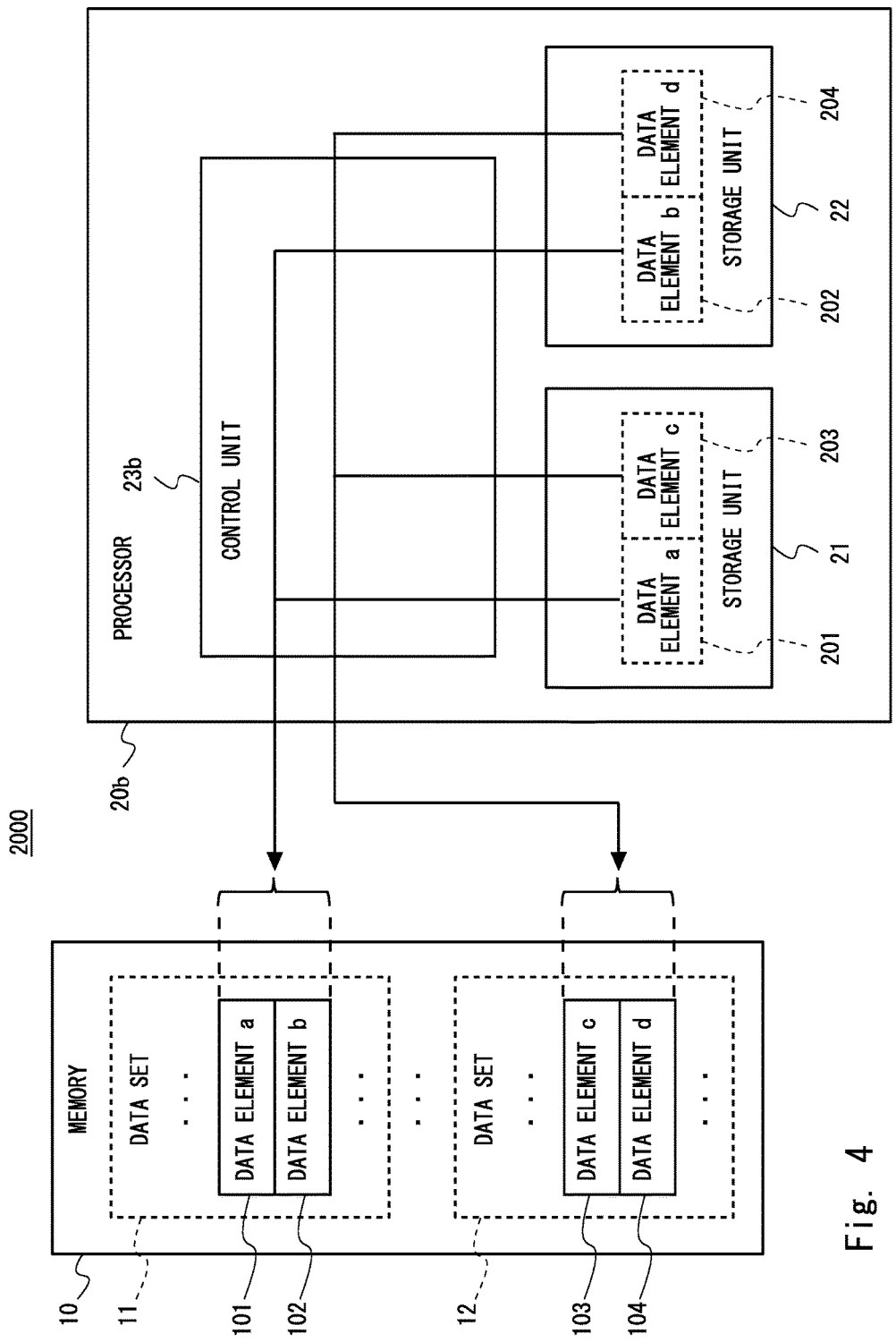
FIG. 4 is a block diagram illustrating a configuration of a data processing device including a processor according to Embodiment 2.

FIG. 4 is a block diagram illustrating a configuration of a data processing device 2000 including a processor 20*b* according to Embodiment 2. The data processing device 2000 includes a memory 10 and the processor 20*b*. The memory 10 is the same as that of FIG. 1, and redundant description thereof will be omitted.

The processor 20*b* includes a storage unit 21, a storage unit 22, and a control unit 23*b*. The storage units 21 and 22 have the same configuration as those of FIG. 1. That is, the storage unit 21 is divided into at least areas 201 and 203. Moreover, the storage unit 22 is divided into at least areas 202 and 204. It is assumed that the subsequent data elements are stored in advance in the storage units 21 and 22. That is, the data element a and the data element c are stored in the areas 201 and 203 of the storage unit 21, respectively. Moreover, the data element b and the data element d are stored in the areas 202 and 204 of the storage unit 22, respectively.

The control unit 23*b* reads the respective data elements stored in the corresponding areas in the storage units 21 and 22 from the plurality of storage units 21 and 22. Here, the "corresponding areas" mean, for example, that the area 201 of the storage unit 21 corresponds to the area 202 of the storage unit 22, and the area 203 of the storage unit 21 corresponds to the area 204 of the storage unit 22. Thus, for example, the control unit 23*b* reads the data element a and the data element b from the areas 201 and 202, respectively. Moreover, the control unit 23*b* puts the data elements read from the respective corresponding areas together to form a data set. For example, the control unit 23*b* puts the data element a and the data element b together to form a data set. The control unit 23*b* writes the respective data elements in the data set to adjacent storage areas in the memory 10. For example, the control unit 23*b* writes the data element a 101 and the data element b 102 to the storage areas in the memory 10, corresponding to the data element a 101 and the data element b 102 of the data set 11. The control unit 23*b* also reads the data elements stored in the areas 203 and 204 collectively, puts the data elements together to form a data set, and writes the data elements to adjacent storage areas in the memory 10 corresponding to the data set 12.

Figure 5:
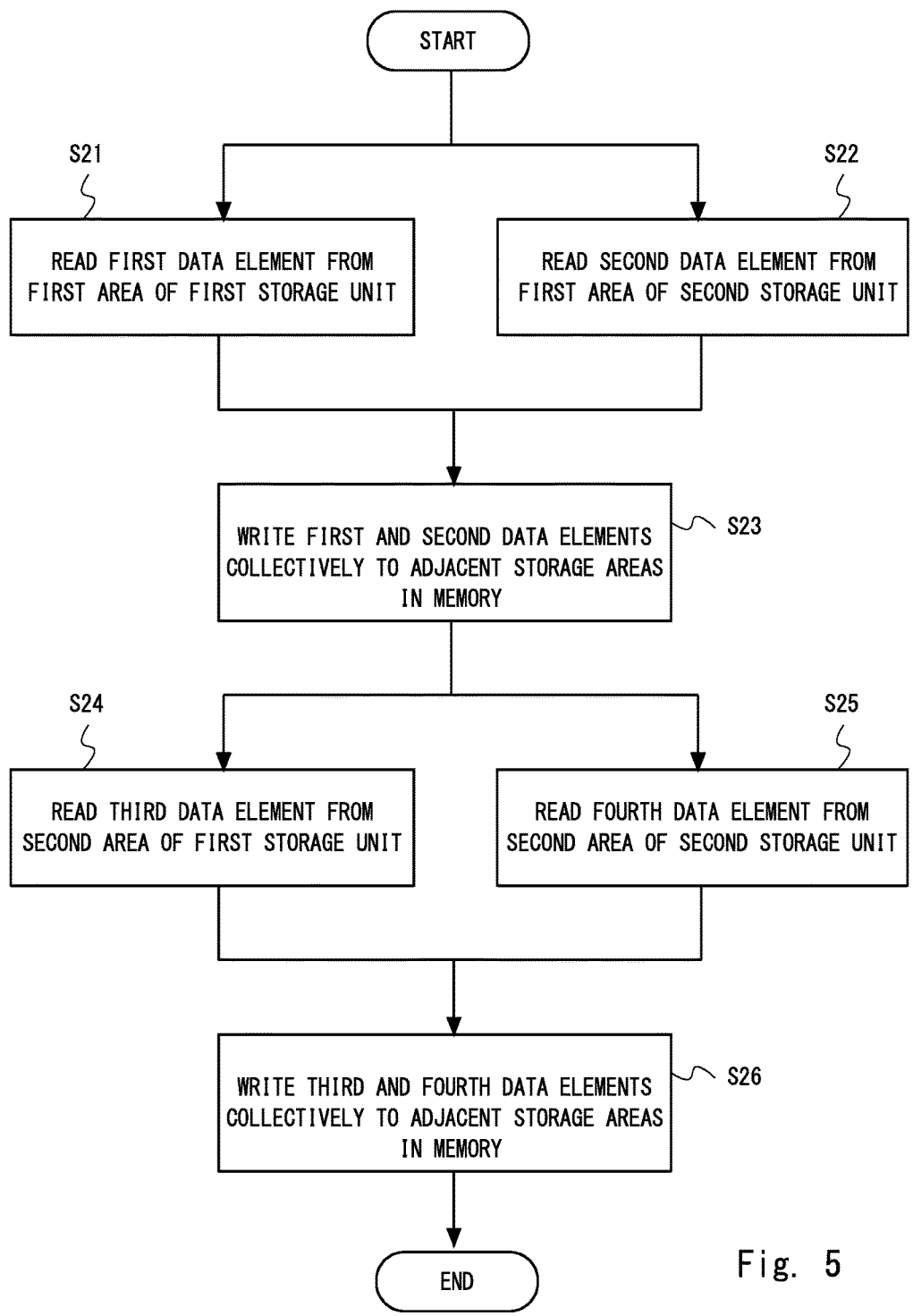
FIG. 5 is a flowchart illustrating the flow of the processes of a data writing method according to Embodiment 2.

FIG. 5 is a flowchart illustrating the flow of the processes of a data writing method according to Embodiment 2. First, the control unit 23*b* of the processor 20*b* reads a first data element (for example, the data element a) from a first area (for example, the area 201) of a first storage unit (for example, the storage unit 21) (S21). Moreover, the control unit 23*b* reads a second data element (for example, the data element b) from a first area (for example, the area 202) of a second storage unit (for example, the storage unit 22) (S22). The area 202 may be an area corresponding to the area 201. Moreover, the control unit 23*b* may read the second data element from the area 204 of the storage unit 22.

Subsequently, the control unit 23*b* writes the first and second data elements collectively to adjacent storage areas in the memory 10 (S23). For example, as described above, in one memory access process, the control unit 23*b* writes the data element a and the data element b to the storage areas in the memory 10 corresponding to the data element a 101 and the data element b 102 of the data set 11, respectively.

Subsequently, the control unit 23*b* reads a third data element (for example, the data element c) from a second area (for example, the area 203) of the first storage unit (S24). Moreover, the control unit 23*b* reads a fourth data element (for example, the data element d) from a second area (for example, the area 204) of the second storage unit (S25). The area 204 may be an area corresponding to the area 203. Here, the control unit 23*b* may read the third data element from an area other than the area from which data has been read at least in step S21 among the areas of the first storage unit. Similarly, the control unit 23*b* may read the fourth data element from an area other than the area from which data has been read at least in step S22 among the areas of the second storage unit.

The control unit 23*b* writes the third and fourth data elements collectively to adjacent storage areas in the memory (S26). For example, in another memory access process different from that of step S23, the control unit 23*b* writes the data element c and the data element d to storage areas in the memory 10 corresponding to the data element c 103 and the data element d 104 of the data set 12. Here, it is assumed that the write destination storage areas in step S26 are different from the write destination storage areas in step S23.

Figure 6:
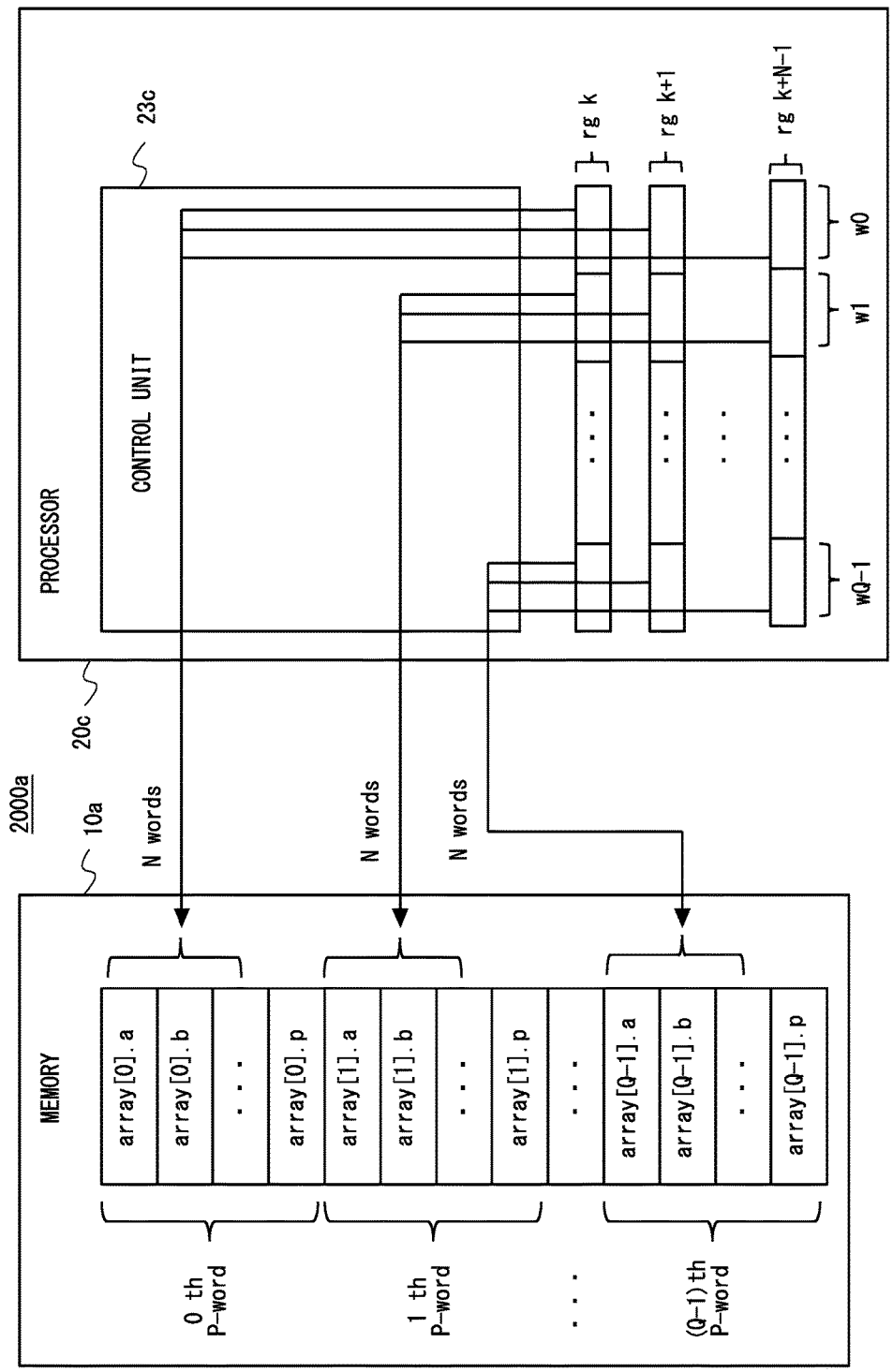
FIG. 6 is a block diagram illustrating another configuration of a data processing device including the processor according to Embodiment 2.

FIG. 6 is a block diagram illustrating a configuration of a parity data 2000*a* including a processor 20*c* according to Embodiment 2. The processor 20*c* is used when the configuration of the processor 20*b* of FIG. 4 is applied to a case in which N words are read from three or more registers and written collectively to the memory 10*a* and areas of read source storage units (registers) are associated as ways.

The processor 20*c* includes a control unit 23*c* and registers $rg_k$ to $rg_{k+N-1}$. Here, the registers $rg_k$ to $rg_{k+N-1}$ are the same as those of FIG. 3. However, it is assumed that data elements are stored in advance in ways w0 to wQ-1 of the registers $rg_k$ to $rg_{k+N-1}$. The processor 20*c* reads data elements from the registers $rg_k$ to $rg_{k+N-1}$ collectively for each way and puts the data elements read for each way together to form a data set. The processor 20*c* writes the respective data elements in the data set to adjacent storage areas in the memory 10*a*. For example, the processor 20*c* reads data elements from the way w0 of the respective registers $rg_k$ to $rg_{k+N-1}$ and writes N words to array[0].a to array[0].n of the memory 10*a* in one memory access process. The processor 20*c* reads data elements similarly for each of the ways w1 to wQ-1 and writes the data elements in the same adjacent storage areas of the data set for respective ways.

In this way, according to Embodiment 2, when writing data groups stored in a plurality of storage units, such as, for example, a group formed by the data elements a and b and a group formed by the data elements c and d, collectively as one data set, the time required for a data storing process can be reduced. This is because the respective data elements read individually from different storage units are written collectively to continuous (adjacent) areas, and it is therefore not necessary to perform memory access processes individually for respective data elements. Moreover, since data elements are read from the corresponding areas in a plurality of storage units, it is not necessary to execute a process of rearranging the read data elements. Thus, the process of storing data between the memory and the storage unit in the processor can be performed efficiently.

Embodiment 3

Here, a problem to be solved by this embodiment will be described again. First, it is assumed that data elements of a structure including a plurality of member variables are continuously stored in a memory as structure arrays. In this case, a vector operation may be performed on the same member variables of the plurality of structure arrays. In order to gather such vector data elements from the memory, a read instruction of reading vector data elements from the memory for respective member variables of each structure generally needs to be issued to a processor. Moreover, in order to store the plurality of vector data elements obtained as the results of the vector operation in a memory, a write instruction of writing vector data elements to the memory from registers in a processor for respective member variables of each structure generally needs to be issued to the processor.

(Conventional Method 1)

In this respect, in the related art, gather and scatter instructions are often implemented in a processor as Conventional Method 1. In general, when a single gather or scatter instruction is issued to a processor, a plurality of memory access instructions is issued from the processor to a memory. For example, the following processes are performed.

(1) Upon receiving a gather instruction, the processor issues a plurality of memory access instructions for data elements stored in discontinuous areas and loads the respective read data elements to one register.

(2) The processor applies a vector operation to the respective data elements loaded to the register as a plurality of vector data elements.

(3) Upon receiving a scatter instruction, the processor reads the respective data elements of the register individually, issues a memory access instruction for writing the data elements to a memory whenever the data elements are read, and writes the data elements to memory addresses of discontinuous areas.

Thus, even when a hardware that forms the processor has a memory bandwidth capable of accessing successive N words, according to Conventional Method 1, since the scatter and gather instructions access data elements in discontinuous areas individually, it is difficult to utilize the bandwidth sufficiently. Thus, in Conventional Method 1, memory access processes are performed in a number of times corresponding to the number of structures and member variables. Moreover, the processing time increases and the processing efficiency decreases.

(Conventional Method 2)

Conventional Method 2 uses a memory access instruction for a plurality of words by utilizing a bandwidth capable of accessing a plurality of words. That is, in Conventional Method 2, in a single memory access process for a plurality of words, data groups stored in continuous areas of a memory are temporarily stored in vector registers. In this stage, data groups of respective structures are stored in the respective vector registers. Thus, after that, a rearrangement process is executed so that the same member variables of the respective structures are stored in the same vector registers. Thus, it is necessary to insert an unnecessary instruction of the rearrangement process within vector registers before and after the vector operation is applied. Thus, in Conventional Method 2, the processing time increases and the processing efficiency decreases.

Therefore, in Embodiment 3, the above problems are solved by adding at least the following configurations to the configuration of Embodiment 1. That is, the control unit writes the read data elements so that writing positions of the data elements in the sort destination storage units correspond to the respective data sets. For example, the data elements of the plurality of words read from a memory by a first memory access are sorted and stored in a plurality of storage units, and in this case, the data elements are written to the same way. The data elements read collectively and simultaneously by subsequent memory accesses (that is, from the same data set) are written to the same way different from the way used in the first memory access. By doing so, the data groups written to the respective storage units in the processor can be used for the vector operation as vector data elements as they are, and data can be gathered more efficiently.

The control unit may preferably sort the respective data elements read from the memory to any one of the plurality of storage units according to the order of the adjacent storage areas in the memory. In this case, the control unit may preferably write the sorted data elements to the respective sort destination storage units. For example, when data elements are stored in a memory according to the order of definitions of the member variables of a structure, the order of definitions is associated with a sort destination storage unit. By doing so, the order of reading data from a memory can be easily associated with a sort destination storage unit, and the configuration of the processor can be simplified.

The control unit may preferably issue, to the memory, a request for reading the plurality of data elements from the continuous storage areas in a number corresponding to the number of a plurality of vector data elements for each data set, in response to an instruction for gathering the vector data elements. In this case, the control unit may preferably sort the data elements read from the memory in response to the request to any one of the plurality of storage units for each request. By doing so, for example, the memory access and the sorting of storage units according to this embodiment can be applied to a gather instruction.

Further, the control unit may issue the request in response to an instruction for gathering the plurality of vector data elements, designate the writing position for each data set, and write the respective sorted data elements to the designated writing positions in the respective sort destination storage units. For example, when a way is designated as the writing position, data elements can be easily written to the corresponding areas in the sort destination storage units in response to a memory access to each data set.

Alternatively, the plurality of storage units each may include a plurality of buffers corresponding to the storage areas of the respective data elements in the data set, and a plurality of registers corresponding to the buffers. The control unit may designate, among the plurality of buffers, different write destination buffers for respective storage areas to sort and write the respective data elements in the designated buffer, read the plurality of data elements in all of the plurality of data sets, and then, write all data elements written to each of the plurality of buffers collectively to the register corresponding to the buffer. In this manner, when data elements are individually written to buffers which can be flexibly rewritten in respective area units, the number of writing operations on a vector register in which it is difficult to rewrite data in respective area units can be reduced and the processing efficiency can be increased.

Further, the processor may further include a vector operation unit that executes a predetermined operation collectively for respective corresponding writing positions in the plurality of storage units. By doing so, the gathered data groups can be efficiently utilized for the vector operation.

Further, the vector operation unit may execute the predetermined operation on at least two of the plurality of storage units. For example, even when a vector operation is performed on data elements stored in areas which are not necessarily adjacent in a data set, data elements which are not used for the vector operation may be read collectively and such data elements themselves may not be subject to the vector operation. By doing so, a memory access process of reading a plurality of words can be performed efficiently.

Further, the plurality of data sets may preferably be a structure which uses the plurality of data elements as member variables, and the plurality of storage units may preferably be associated with the member variables. The control unit may preferably sort and write the respective read data elements to the plurality of storage units associated with the member variables. By doing so, a vector operation can be performed efficiently on a structure defined including a plurality of data types.

Figure 7:
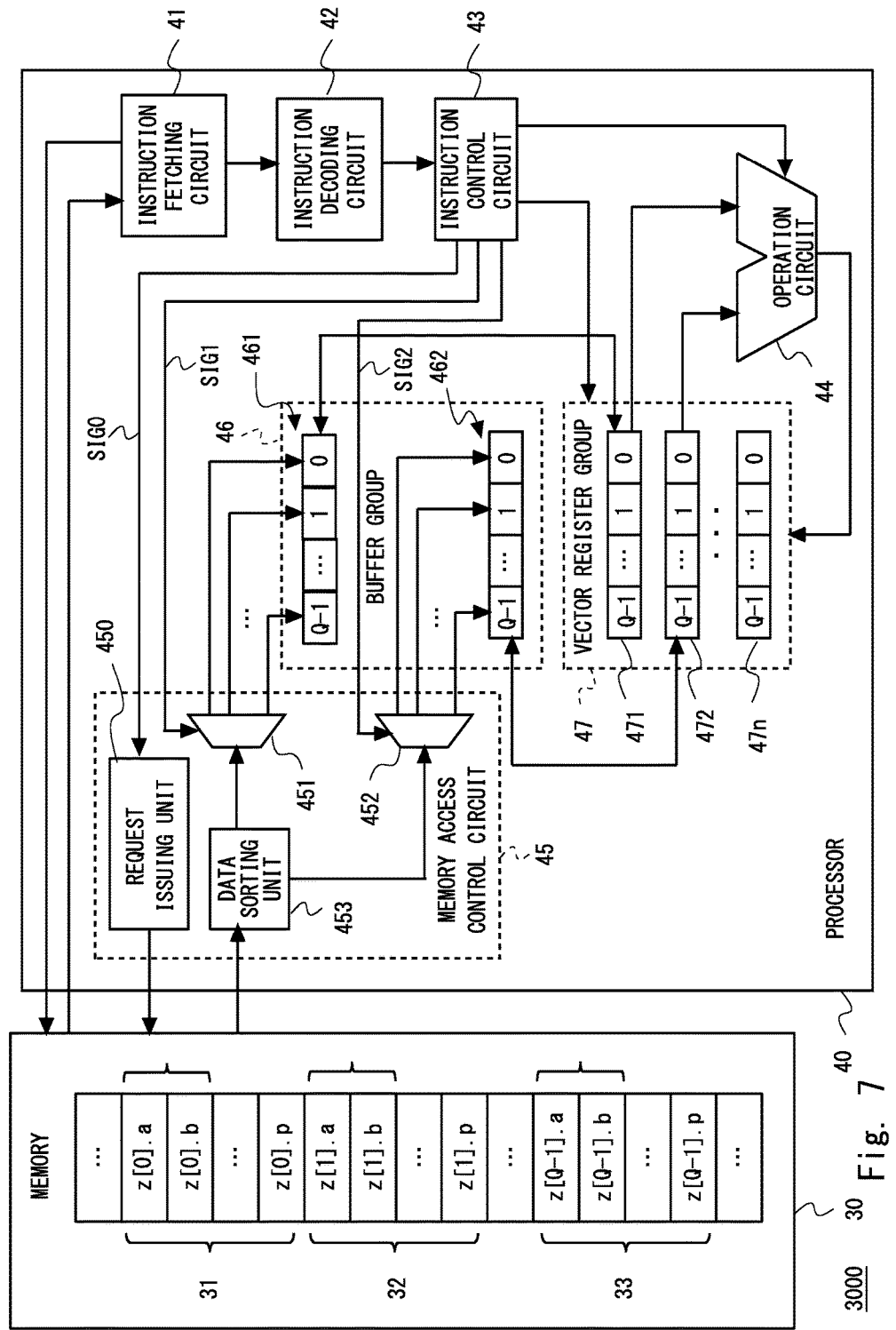
FIG. 7 is a block diagram illustrating a configuration of a data processing device including a processor according to Embodiment 3.

Next, a gather instruction of gathering data elements to a plurality of vector registers according to Embodiment 3 will be described in detail. FIG. 7 is a block diagram illustrating a configuration of a data processing device 3000 including a processor 40 according to Embodiment 3. The data processing device 3000 is an improvement example of the data processing device 1000 according to Embodiment 1 and includes a memory 30 and the processor 40. The memory 30 has the same configuration as the memory 10 and structures 31, 32, . . . , and 33 are stored therein. Here, it is assumed that the structure 31 or the like is a structure having P member variables (P is a natural number of 2 or more) and Q data elements (Q is a natural number of 2 or more) are stored in the memory 30. A structure is a variable having variable definitions of a plurality of data types. When the structure 31 or the like is expressed in C language, the structure can be defined as the following structure arrays.

$$\text{struct} \begin{Bmatrix} \text{int } a, \\ \text{int } b, \\ \ldots \\ \text{int } p; \end{Bmatrix} z[Q];$$

Moreover, it is assumed that data values corresponding to member variables of each structure are stored in adjacent areas of the memory 30. Further, it is assumed that various instructions executable by the processor 40 are also stored in the memory 30.

Moreover, it is assumed that the gather instruction according to this embodiment includes the following operands, for example.

Starting memory address A of read source memory (corresponding to starting storage area of structure array, for example)

Starting register number k of write destination (k corresponds to number Q of read target structures and is a natural number equal to or smaller than an upper limit number of ways W)

Number of words N for successive memory accesses (N is a natural number of 2 or more and P or smaller)

Size C for updating memory addresses (C is the same as structure size P)

The processor 40 is an improvement example of the processor 20 according to Embodiment 1. The processor 40 includes an instruction fetching circuit 41, an instruction decoding circuit 42, an instruction control circuit 43, an operation circuit 44, a memory access control circuit 45, a buffer group 46, and a vector register group 47. It is assumed that the processor 40 can access N words of data elements in one clock cycle. The instruction fetching circuit reads an instruction from the memory 30 and outputs the instruction to the instruction decoding circuit 42. The instruction decoding circuit 42 analyzes the input instruction and outputs the analysis results (decoding results) to the instruction control circuit 43. The instruction control circuit 43 outputs appropriate signals to the memory access control circuit 45, the vector register group 47, and the operation circuit 44 based on the decoding results of the input instruction.

The operation circuit 44 executes a vector operation on the plurality of vector data elements read from the vector register group 47 in response to an instruction from the instruction control circuit 43 and writes the operation results to the vector register group 47.

The buffer group 46 includes buffers 461 and 462. The buffers 461 and 462 each are a storage device which is divided into areas of ways w0 to wQ−1 so as to store data elements in the respective areas. Moreover, the buffers 461 and 462 can update the data elements in respective way units. The buffer group 46 may include N buffers.

The vector register group 47 includes vector registers 471, 472, . . . , and 47n (n is a natural number of 2 or more). The vector registers 471 and the like each are a storage device which is divided into areas of ways w0 to wQ−1 so as to store data elements in respective areas. That is, the vector registers 471 and the like are register files capable of storing k words per entry. However, it is assumed that the vector registers 471 and the like cannot update data in respective way units but in respective register units (that is, updates Q data elements collectively) in order to allow the operation circuit 44 to execute the vector operation at a high speed. Moreover, the vector register 471 and the buffer 461 are connected (that is, the two are associated with each other) and a set of stored data elements can be migrated between them. Similarly, the vector register 472 and the buffer 462 are connected (that is, the two are associated with each other) and a set of stored data elements can be migrated between them.

The memory access control circuit 45 is a circuit that controls a memory access process from the processor 40 to the memory 30. The memory access control circuit 45 includes a request issuing unit 450, switching units 451 and 452, and a data sorting unit 453. Upon receiving a memory read request signal SIG0 from the instruction control circuit 43, the request issuing unit 450 issues a memory access (read) request to the memory 30, including a designated starting memory address A and a designated number of words N included in the signal SIG0. After that, each time receiving a response to the request, the request issuing unit 450 issues a request by adding the size C to the memory address A. The request aims to read a set of data elements stored in adjacent areas of the designated N words. In this embodiment, it is assumed that two words are read. Moreover, the instruction control circuit 43 may add the size C to the memory address A.

The data sorting unit 453 receives a set of two words of data elements as a response to the memory access request and sorts the respective data elements to any one of the switching units 451 and 452. The data sorting unit 453 may sort the data elements in the order in which the respective data elements are read from the memory 30. That is, a data element read earlier may be output to the switching unit 451 and a data element read later may be output to the switching unit 452.

The switching units 451 and 452 select a write destination way based on the designations in write destination control signals SIG1 and SIG2 from the instruction control circuit 43 and write the data elements received from the data sorting unit 453. Here, the switching unit 451 is connected to the buffer 461 so as to write data elements to any one of the designated ways w0 to wQ-1 in the buffer 461. Similarly, the switching unit 452 is connected to the buffer 462 so as to write data elements to any one of the designated ways w0 to wQ-1 in the buffer 462.

Here, when the instruction decoding circuit 42 decodes a vector operation instruction, the instruction control circuit reads predetermined vector data elements from the vector register group 47 and issues a vector operation instruction to the operation circuit 44. The operation circuit 44 executes a vector operation on the plurality of vector data elements based on the instruction and writes the operation results to the vector register group 47.

When the instruction decoding circuit 42 decodes a gather instruction according to this embodiment, the processor 40 communicates with the memory 30 via the memory access control circuit 45. That is, the instruction control circuit 43 outputs the memory read request signal SIG0 including a designated starting memory address A and a designated number of words N to the request issuing unit 450. Moreover, the instruction control circuit 43 outputs the write destination control signals SIG1 and SIG2 including the same designated way number W (register number k) to the switching units 451 and 452. The instruction control circuit 43 outputs the signals SIG0 to SIG2 a number of times Q corresponding to the number of structures each time the memory access control circuit 45 receives a response to the request. In this case, the instruction control circuit 43 outputs the memory read request signal SIG0 by adding the size C to the memory address A. Moreover, the instruction control circuit 43 adds "1" to the way number W and outputs the write destination control signals SIG1 and SIG2 including the designated way number after addition. In other words, the instruction control circuit 43 can output the signals SIG0 to SIG2 repeatedly up to the largest number of the way number W.

Figure 8:
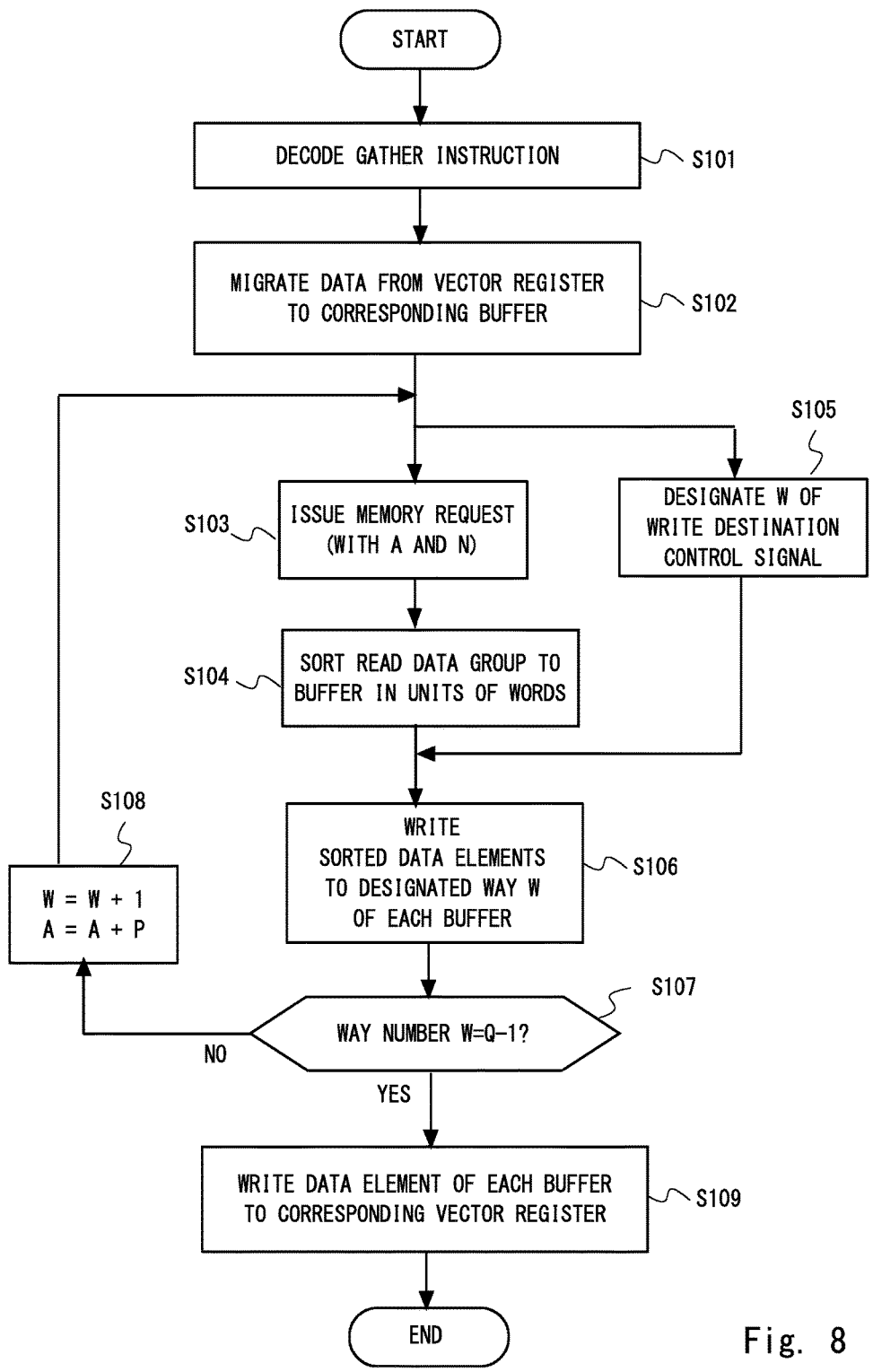
FIG. 8 is a flowchart illustrating the flow of the processes of a gather instruction according to Embodiment 3.
Figure 9:
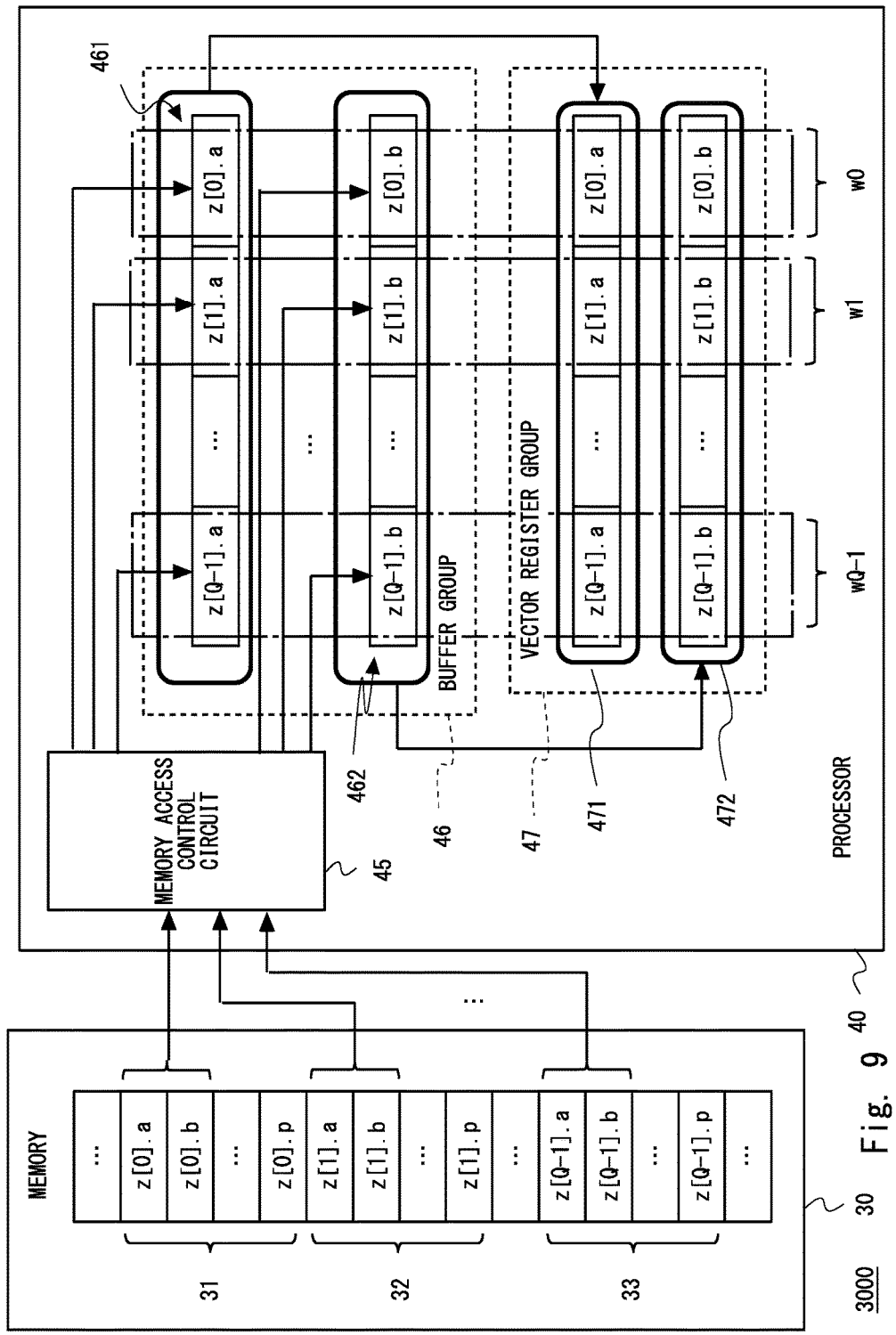
FIG. 9 is a diagram for describing the concept of the operation of a gather instruction to a plurality of vector registers according to Embodiment 3.

FIG. 8 is a flowchart illustrating the flow of the processes of a gather instruction according to Embodiment 3. Moreover, FIG. 9 is a diagram for describing the concept of the operation of a gather instruction to a plurality of vector registers according to Embodiment 3. In the following description of FIG. 8, FIG. 9 is referenced appropriately.

First, it is assumed that a gather instruction according to this embodiment is set. The instruction decoding circuit decodes the gather instruction (S101). In response to this, the instruction control circuit 43 performs initial setting. In this initial setting, it is assumed that the starting memory address A is a storage destination address of a member variable z[0].a of the structure 31, the way number W as a register number k is "w0," the number of words N is "2," and an addition value C of the memory address is P.

Subsequently, the instruction control circuit 43 issues an instruction of migrating data elements from the respective vector registers to the corresponding buffers to the vector register group 47 (S102). In this example, a data group corresponding to one entry stored in the vector register 471 is stored in the buffer 461 and a data group corresponding to one entry stored in the vector register 472 is stored in the buffer 462.

Subsequently, the instruction control circuit 43 outputs the memory read request signal SIG0 including the designated starting memory address A and the designated number of words N to the request issuing unit 450. In response to this, the request issuing unit 450 issues a memory access request to the memory 30 by designating the starting memory address A and the number of words N (S104). In this example, the data values (hereinafter simply referred to as z[0].a and z[0].b) stored in member variables z[0].a and z[0].b of the structure 31 are read from the memory 30. That is, the data elements corresponding to two words stored in the adjacent areas are read from the memory 30. The data sorting unit 453 sorts the read data groups to buffers for respective words (S105). In this example, the data sorting unit 453 outputs the data value z[0].a to the switching unit 451 and outputs the data value z[0].b to the switching unit 452.

In parallel with steps S103 and S104, the instruction control circuit 43 outputs write destination control signals SIG1 and SIG2 including the designated way w0 to the switching units 451 and 452, respectively (S105).

After steps S103 to S105 are performed, the switching units 451 and 452 write the respective sorted data elements to the designated way W of the respective buffers (S106). In this example, the switching unit 451 writes the data value z[0].a to the way w0 of the buffer 461 designated by the write destination control signal SIG1. Moreover, the switching unit 452 writes the data value z[0].b to the way w0 of the buffer 462 designated by the write destination control signal SIG2 (for example, see the way w0 of the buffers 461 and 462 illustrated in FIG. 9).

After that, the instruction control circuit 43 determines whether the way number W is "Q-1" (S107). In this example, since the way number W is "0," the instruction control circuit 43 adds "1" to W so that the way number becomes w1 and adds "P" to A (S108).

Subsequently, the instruction control circuit 43 executes steps S103 to S107 based on the results of step S108. That is, the request issuing unit 450 issues a request for reading two words of data from the address of the data value z[1].a of the structure 32 of the memory 30 (S103). Thus, the data values z[1].a and z[1].b of the structure 32 are read from the memory 30. The data sorting unit 453 outputs the data value z[1].a to the switching unit 451 and outputs the data value z[1].b to the switching unit 452 (S104). Moreover, the instruction control circuit 43 outputs the write destination control signals SIG1 and SIG2 including the designated way w1 to the switching unit 451 and 452, respectively (S105). After that, the switching unit 451 writes the data value z[1].a to the way w1 of the buffer 461. Moreover, the switching unit 452 writes the data value z[1].b to the way w1 of the buffer 462 (S106, for example, see the way w1 of the buffers 461 and 462 illustrated in FIG. 9).

After that, steps S103 to S108 are repeatedly executed until it is determined in step S107 that the way number W is "Q-1". Thus, when the way number W is "Q-1," the data value z[Q-1].a is written to the way wQ-1 of the buffer 461 and the data value z[Q-1].b is written to the way wQ-1 of the buffer 462 (S106, for example, see the way wQ-1 of the buffers 461 and 462 illustrated in FIG. 9).

When it is determined in S107 that the way number W is "Q-1," the instruction control circuit 43 writes the data elements of the respective buffers to the corresponding vector registers (S109). That is, the data values z[0].a to z[Q-1].a of the ways w0 to wQ-1 of the buffer 461 are written to the vector register 471, and the data values z[0].b to z[Q-1].b of the ways w0 to wQ-1 of the buffer 462 are written to the vector register 472 (for example, see the ways w0 to wQ-1 of the vector registers 471 and 472 illustrated in FIG. 9). After that, this process ends.

In this manner, by step S103, data elements are read from two words of continuous areas of the memory 30. That is, different member variables defined in an successive order in a structure are read collectively.

If C is the size P of a structure, the process of adding "C" to the starting memory address A in step S108 corresponds to incrementing the index of a structure array by "1". Thus, in the next memory load operation, N words of data elements of another adjacent structure are read.

Further, two words of data elements read in steps S104 and S106 are sorted to different buffers and the respective data elements are stored in the corresponding way of the buffers. In this way, the process corresponding to the rearrangement process performed in Conventional Method 2 can be realized in a series of processes of reading and writing data elements. Thus, the rearrangement process within vector registers as in Conventional Method 2 is unnecessary and the processing time can be reduced. That is, in this embodiment, member variables that are common to respective vector registers can be gathered, and it is easy to apply the vector operation.

Figure 13:
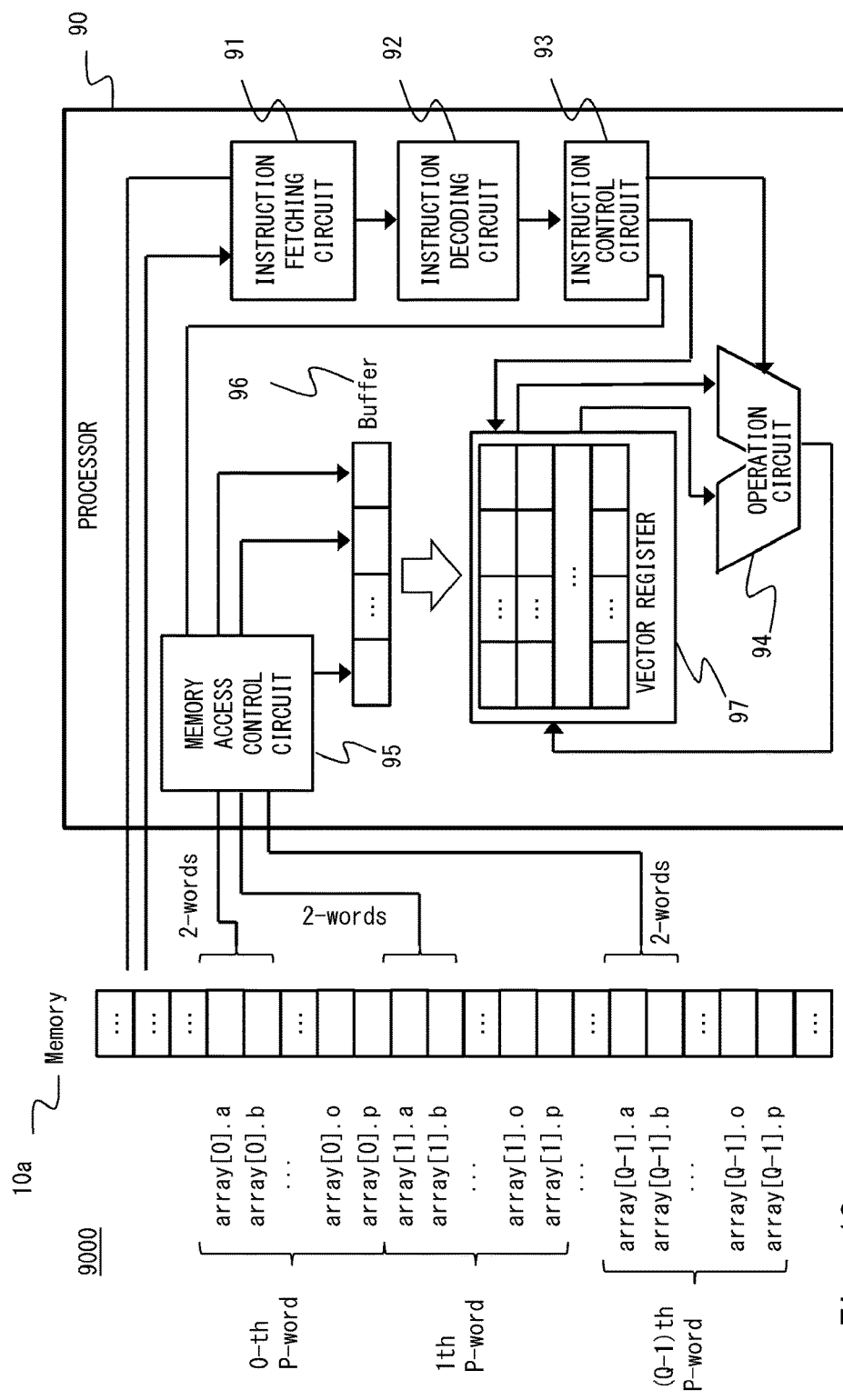
FIG. 13 is a diagram for describing the concept of a gather instruction according to the related art.

Here, Conventional Method 1 will be described again. FIG. 13 is a diagram for describing the concept of a gather instruction in Conventional Method 1. FIG. 13 illustrates an example of a hardware configuration of a data processing device 9000 for realizing the gather instruction of Conventional Method 1. The data processing device 9000 includes a memory 10a and a processor 90. The processor 90 includes an instruction fetching circuit 91, an instruction decoding circuit 92, an instruction control circuit 93, an operation circuit 94, a memory access control circuit 95, a buffer 96, and a vector register group 97. Here, the instruction fetching circuit 91, the instruction decoding circuit 92, the operation circuit 94, and the vector register group 97 may be the same as those of FIG. 7. The buffer 96 has the same configuration as that of the buffer 461 of FIG. 7. However, only one buffer 96 is provided. Upon receiving the gather instruction of Conventional Method 1, the instruction control circuit 93 issues a number of instructions corresponding to (number of structure arrays)×(number of member variables) to the memory access control circuit 95. Moreover, although the memory access control circuit 95 reads a plurality of words collectively, only one data element remains and the other data elements are discarded. The flow will be described below.

Figure 15:
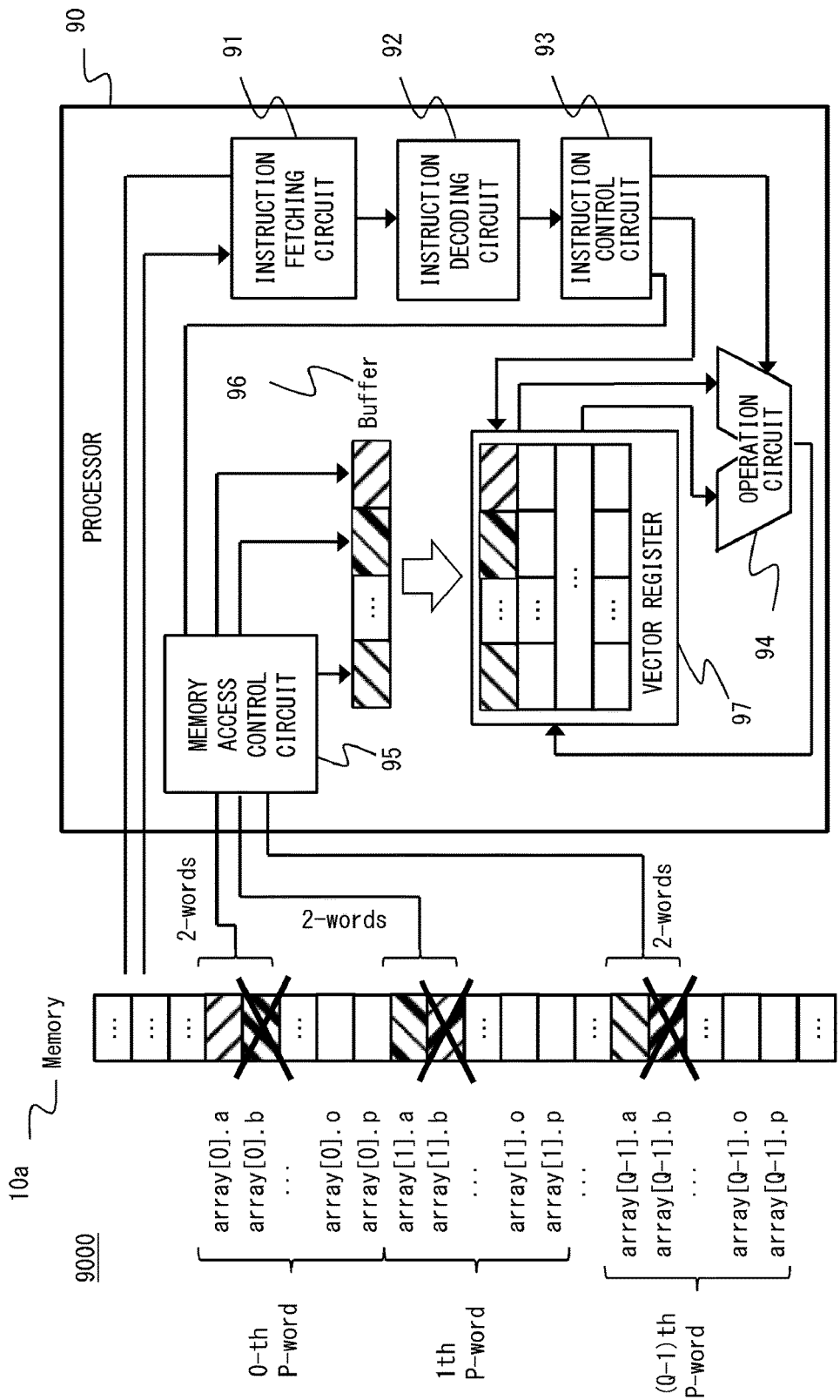
FIG. 15 is a diagram for describing the concept of the operation of a gather instruction to a plurality of vector registers according to the related art.
Figure 16:
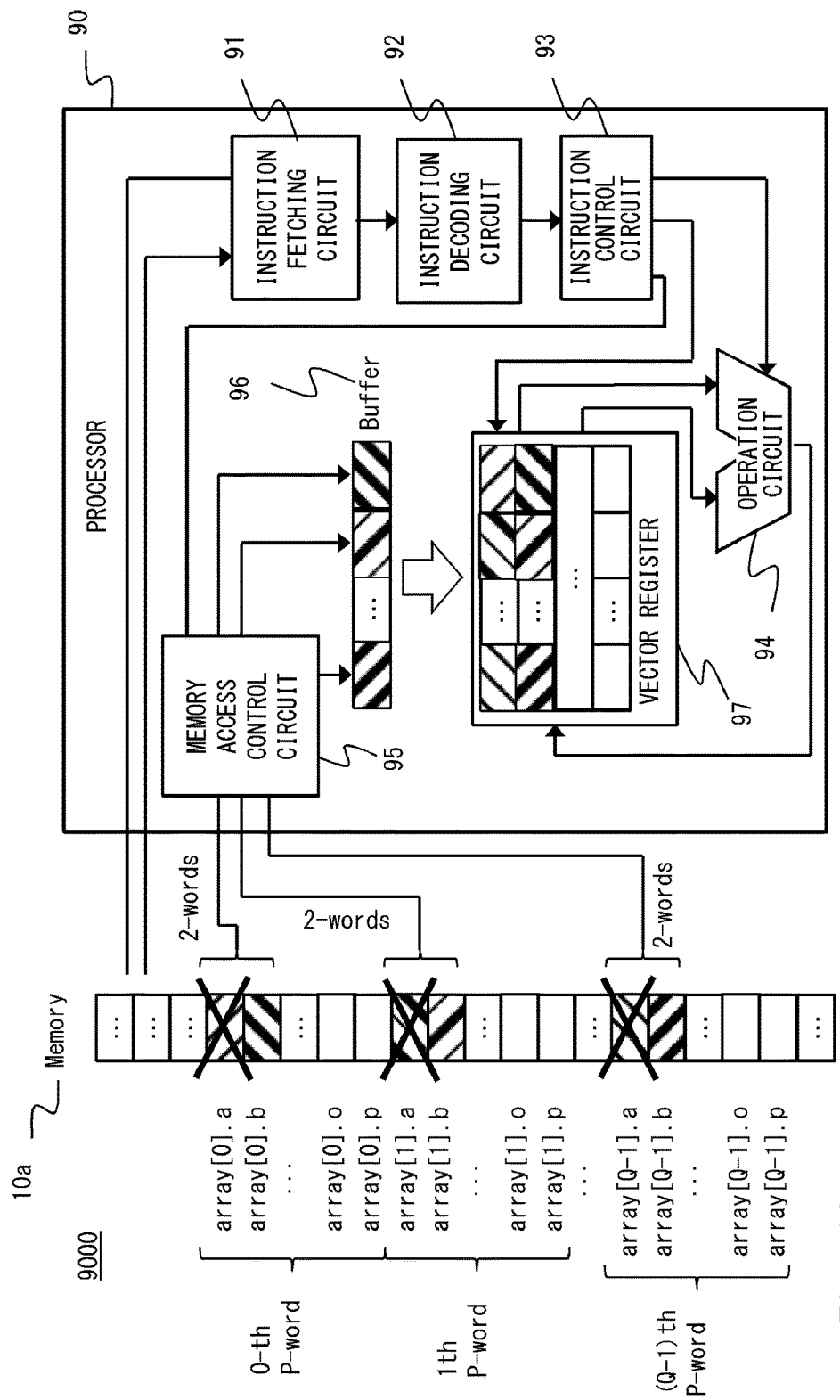
FIG. 16 is a diagram for describing the concept of the operation of a gather instruction to a plurality of vector registers according to the related art.

FIGS. 15 and 16 are diagrams for describing the concept of the operation of a gather instruction to a plurality of vector registers according to Conventional Method 1. FIGS. 15 and 16 illustrate the operation of the gather instruction according to Conventional Method 1 when a vector register has a memory bandwidth capable of accessing 64 bits simultaneously in one clock cycle and is capable of storing four words.

In FIGS. 15 and 16, since the vector register 97 has a memory bandwidth of four words, the gather instruction of Conventional Method 1 issues four memory read requests to discontinuous memory areas. This operation is performed on the memory 10a in at least four cycles. Although the memory 10a can read two words in one clock, since the gather instruction can use only one word in that period, one word that is unnecessary is discarded. The data elements read earlier from the memory 10a are stored in a buffer until four words of data elements to be stored in the vector register 97 are returned to the processor 90. When one entry of data elements are stored in the buffer 96, the data elements are written to the vector register 97. Specifically, the following operations are performed.

In response to an instruction from the instruction control circuit 93, although the memory access control circuit reads array[0].a and array[0].b of the memory 10a collectively, array[0].b is discarded and array[0].a is stored in the way w0 of the buffer 96. Subsequently, although the memory access control circuit 95 reads array[1].a and array[1].b of the memory 10a collectively, array[1].b is discarded and array[1].a is stored in the way w1 of the buffer 96. After that, similarly, the memory access control circuit reads array[Q−1].a and array[Q−1].b of the memory 10a collectively and stores array[Q−1].a in the way wQ−1 of the buffer 96 while discarding array[Q−1].b. After that, one entry of data elements are written from the buffer 96 to the corresponding registers of the vector register group 97 (see FIG. 15).

Subsequently, the memory access control circuit 95 performs Q memory accesses and stores array[0].b to array[Q−1].b to the ways w0 to wQ−1 of the buffer 96 while discarding array[0].a to array[Q−1].a whenever the memory access is performed. After that, one entry of data elements are written from the buffer 96 to other corresponding registers of the vector register group 97 (see FIG. 16).

As described above, the method of using the gather instruction of Conventional Method 1 cannot effectively utilize the hardware's ability to load a plurality of words on a memory in one clock as compared to this embodiment. In the case of FIGS. 15 and 16, at least four cycles are required for gathering four words of data elements, and only ½ of the memory bandwidth can be utilized among the memory bandwidth (=4×2) that can be utilized in that period.

In contrast, in the processor 40 according to this embodiment, in order to secure a plurality of words of data elements corresponding to the length of a vector register, a necessary number of buffers are added in addition to the buffer 96 of FIG. 13. That is, as described above, in the processor 40 storing a vector operation instruction capable of accessing two words simultaneously and storing up to four words of data elements, a buffer for rearranging data elements while storing (two words)×(four words)=(16 words) is used.

The gather instruction to a plurality of vector registers according to this embodiment involves loading two successive words simultaneously, sorting the respective words loaded simultaneously to different buffers 461 and 462, and changing the designated write destination ways of the respective structures. Due to this, data rearrangement is completed simultaneously with the step of storing data elements in the buffer. Thus, unlike Conventional Method 1, it is not necessary to discard the plurality of words of read data elements other than one data element. Thus, the gather instruction according to this embodiment can utilize the memory bandwidth more efficiently than the gather instruction of Conventional Method 1.

Under the above-described conditions, in this embodiment, eight words of data elements are gathered by one instruction, four memory accesses and two register writing operations are required for this gathering. Thus, the number of memory access processes can be reduced as compared to the gather instruction of Conventional Method 1, the processing time can be reduced, and the processing efficiency can be increased.

Figure 17:
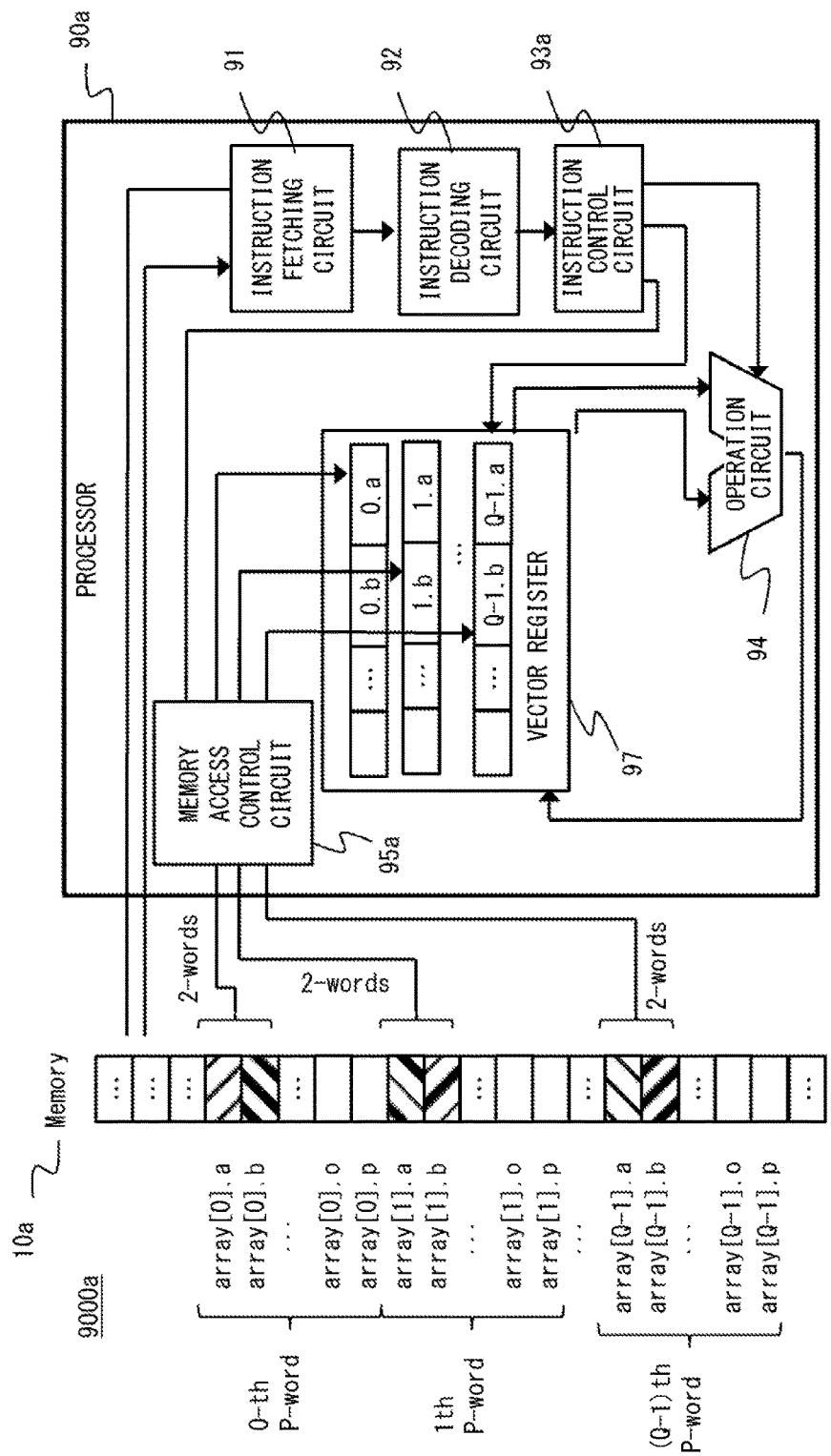
FIG. 17 is a diagram for describing the concept of the operation of a load instruction of loading a plurality of words according to the related art.

Conventional Method 2 will be described again. Conventional Method 2 utilizes an instruction of loading a plurality of successive words. FIG. 17 is a diagram for describing the concept of the operation of a load instruction of loading a plurality of words according to the related art. FIG. 17 illustrates an example of a hardware configuration of a data processing device 9000a for realizing a load instruction of loading a plurality of words according to Conventional Method 2. The data processing device 9000a includes a memory 10a and a processor 90a. In the processor 90a, the instruction control circuit 93 and the memory access control circuit 95 of the processor 90 are replaced with an instruction control circuit 93a and a memory access control circuit 95a, respectively, and a buffer corresponding to the buffer 96 is omitted.

In this example, the operation of an instruction of loading a plurality of words when a vector register has a memory bandwidth of accessing 64 bits simultaneously in one clock cycle and is capable of storing four words will be described.

In Conventional Method 2, first, the processor 90a stores member variables array[0].a and array[0].b of the 0th structure array in one vector register 97 using an instruction of loading a plurality of successive words. The processor 90a adds "1" to the index of the structure array and repeats the loading of a plurality of words. In this case, Q load instructions (that is, at least Q clock cycles) are required.

As described above, in Conventional Method 2, since a plurality of successive words are loaded, the memory bandwidth of the hardware can be utilized up to 64 bits. In the case of Conventional Method 2, successive data elements are written to successive ways of the same vector register at a time. Thus, different members of the structure are stored in the same vector register, and it is difficult to apply the vector operation.

Figure 18:
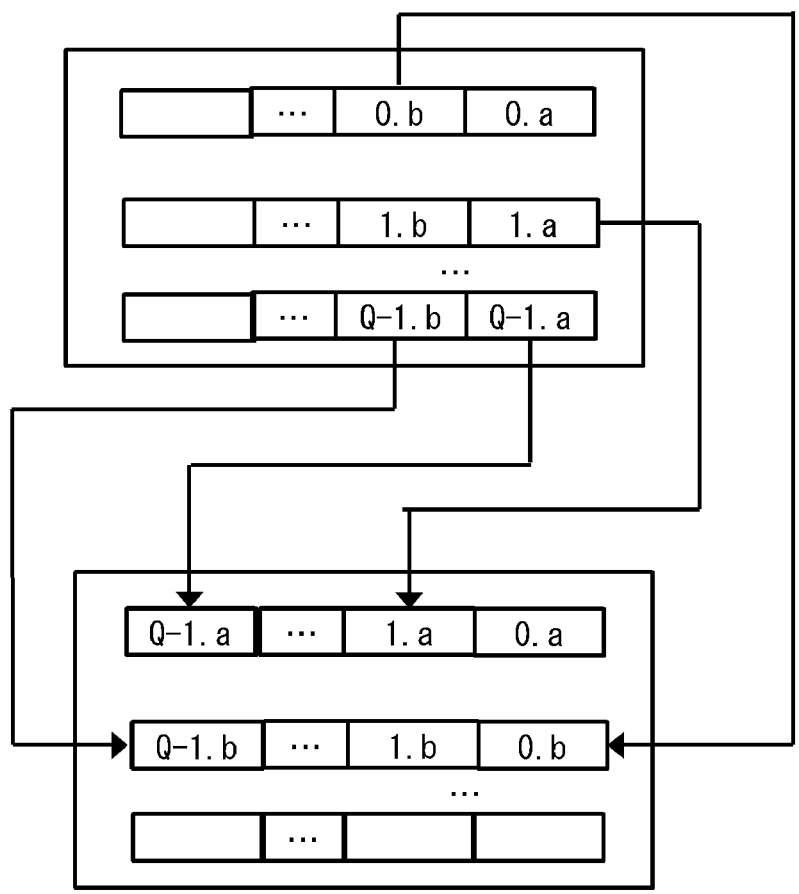
FIG. 18 is a diagram for describing the concept of the operation of a process of rearranging data in a vector register according to the related art.

Thus, after all data elements are loaded, the processor 90a executes a rearrangement process on the data elements stored in the vector register group 97 and gathers the same member variables in the same vector register. FIG. 18 is a diagram for describing the concept of the operation of a data rearrangement process within a vector register according to Conventional Method 2.

Before the rearrangement process starts, the respective member variables of the same structure arrays are stored in the respective vector registers. Thus, in this state, the member variables cannot be used for the vector operation. Thus, a rearrangement process is executed in order to store the same member variables of different structure arrays in the respective vector registers. In this case, specifically, data elements are rearranged in respective areas of the vector registers while saving the entries of the respective vector registers temporarily in a buffer. Further, since the vector register is updated every entry, rearrangement of data elements in respective areas requires a large number of steps. Thus, the rearrangement process may increase the number of required instructions, which may increase the possibility of decreasing the performance.

For example, in the above example of Conventional Method 2, four instructions are issued in order to load eight words of data, and four memory accesses and four register writing operations are required. On the other hand, as described above, the gather instruction according to this embodiment requires only one instruction to be issued and two register writing operations to be performed in order to load eight words of data elements. That is, the load instruction of loading a plurality of words according to Conventional Method 2 requires four instructions whereas this embodiment requires only one instruction in order to obtain the same results. Thus, other operation instructions which are not related to the gather instruction can be executed until the gather instruction according to this embodiment is completed. Moreover, the memory bandwidth can be utilized. Further, the process corresponding to the rearrangement process is performed in parallel with the storing of data elements in the buffer. Thus, an instruction for the rearrangement process is not required, an increase in the number of instructions and the number of necessary registers can be prevented, and a decrease in performance can be prevented as compared to Conventional Method 2.

Embodiment 4

Embodiment 4 is an improvement example of Embodiment 2 described above. Moreover, Embodiment 4 solves the problems occurring in the scatter instruction in Conventional Method 1 and the instruction of storing a plurality of words in Conventional Method 2. The problems of Conventional Methods 1 and 2 are the same as those occurring in the gather instruction and the load instruction of loading a plurality of words.

Therefore, in Embodiment 4, the above problems are solved by adding at least the following configurations to the configuration of Embodiment 2. That is, the control unit writes the respective read data elements so that the storage areas of the data elements in the plurality of storage units correspond to each other. That is, the data elements read from the same storage units in a processor can be written to the positions of the corresponding storage areas of different data sets. Due to this, the results of a vector operation can be returned to the original storage positions and data elements can be written efficiently.

Moreover, the control unit may preferably read respective data elements from the corresponding areas in the plurality of storage units for each of the plurality of areas in response to an instruction for storing the plurality of vector data elements in the memory. The control unit may preferably group the respective data elements read from the corresponding areas to form the data set for each of the plurality of areas. The control unit may preferably issue, to the memory, a request for storing respective data elements of the grouped data set in the continuous storage areas in a number corresponding to the number of vector data elements for each of the plurality of areas. By doing so, the results of the vector operation can be appropriately rearranged to the member variables of the structure.

Further, the control unit may issue the request and designates the area for each of the plurality of areas in response to an instruction for storing a plurality of vector data elements in the memory, and read the respective data elements from each of the plurality of storage units using the designated area as the corresponding area. By doing so, for example, the read and memory accesses from the storage unit according to this embodiment can be applied to the scatter instruction.

Further, the plurality of storage units each may include a plurality of registers capable of reading and writing data in the entire divided area units, and a plurality of buffers which correspond to the respective registers and are capable of reading and writing data in the individual area units. The control unit may read all of the plurality of data elements stored in each of the plurality of registers and write the data elements collectively to the respective buffers corresponding to the respective registers. The control unit may read, for each of corresponding areas in the registers, the respective data elements stored in the areas of the respective buffers. The control unit may put the read data elements together to form a writing data set for each of the corresponding areas, and write the respective data elements in the data set to adjacent storage areas in the memory. By doing so, when data elements are individually read to buffers which can flexibly read data elements in respective area units, the number of reading operations on a vector register in which it is difficult to read data in respective area units can be reduced and the processing efficiency can be increased.

The processor may further include a vector operation unit that executes a predetermined operation collectively for respective corresponding writing positions in the plurality of storage units, and writes the results of the predetermined operation to the plurality of storage units, and the control unit may start the reading after the vector operation unit writes the results of the predetermined operation. By doing so, the results of the vector operation can be returned to the original memory efficiently without requiring the rearrangement process.

Figure 10:
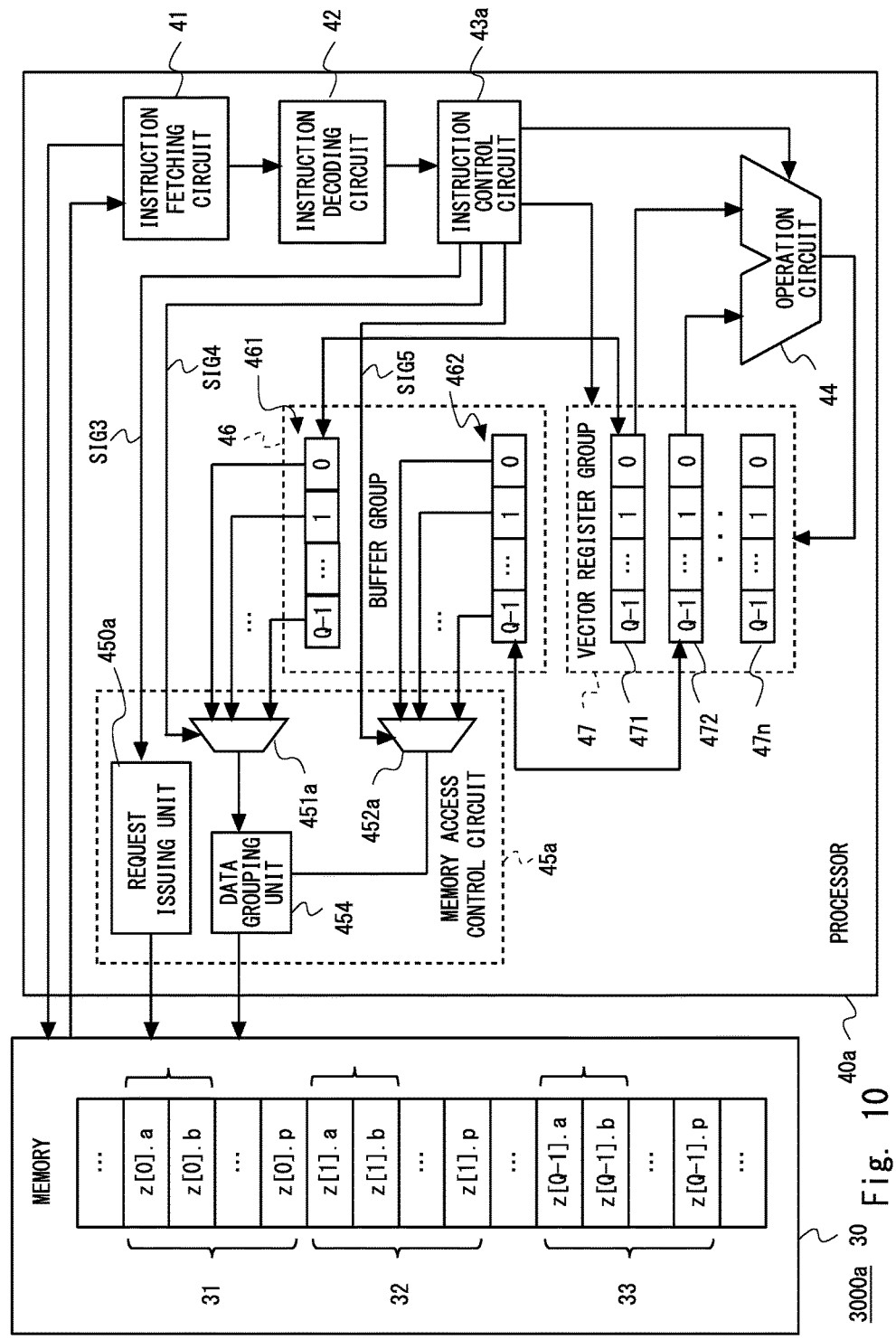
FIG. 10 is a block diagram illustrating the configuration of a data processing device including a processor according to Embodiment 4.

Next, a scatter instruction to a plurality of vector registers according to Embodiment 4 will be described in detail. FIG. 10 is a block diagram illustrating a configuration of a data processing device 3000a including a processor 40a according to Embodiment 4. The data processing device 3000a is an improvement example of the data processing device 2000 according to Embodiment 2 and includes a memory 30 and the processor 40a. The memory 30 has the same configuration as that of FIG. 7.

The scatter instruction of this embodiment stores data elements of a plurality of vector registers k to k+N−1 in an array of structures disposed on a memory. It is assumed that the scatter instruction according to this embodiment includes the following operands, for example.

Starting memory address A of write destination memory (corresponding to starting storage area of structure array, for example)

Starting register number k of read source (k corresponds to number Q of reading target structures and is a natural number equal to or smaller than an upper limit number of ways W)

Number of words N for successive memory accesses (N is a natural number of 2 or more and P or smaller)

Size C for updating memory addresses (C is the same as structure size P)

The processor 40a is an improvement example of the processor 20b according to Embodiment 2. The processor 40a includes an instruction fetching circuit 41, an instruction decoding circuit 42, an instruction control circuit 43a, an operation circuit 44, a memory access control circuit 45a, a buffer group 46, and a vector register group 47. It is assumed that the processor 40a can access N words of data elements in one clock cycle. The instruction fetching circuit 41, the instruction decoding circuit 42, the operation circuit 44, the buffer group 46, and the vector register group 47 are the same as those of FIG. 7. However, it is assumed that data elements have been stored in advance in the respective ways of the vector registers 471 and 472 of the vector register group 47. For example, the results of a predetermined vector operation may be stored in the vector registers 471 and 472.

The memory access control circuit 45a is a circuit that controls a memory access process from the processor 40a to the memory 30. The memory access control circuit 45a includes a request issuing unit 450a, switching units 451a and 452a, and a data grouping unit 454. Upon receiving a memory write request signal SIG3 from the instruction control circuit 43a, the request issuing unit 450a designates the starting memory address A and the number of words N included in the signal SIG3 and issues a memory access (write) request to the memory in order to write the data set generated by the data grouping unit 454. After that, each time receiving a response to the request, the request issuing unit 450a issues a request by adding the size C to the memory address A. The request aims to store respective data elements in adjacent areas of the designated N words. In this embodiment, it is assumed that two words are written. Moreover, the instruction control circuit 43a may add the size C to the memory address A.

The switching units 451a and 452a select a read source way based on the designations of read source control signals SIG4 and SIG5 from the instruction control circuit 43a and read the data elements from the selected way. Here, the switching unit 451a is connected to the buffer 461 so as to read data elements from any one of the designated ways w0 to wQ−1 in the buffer 461. Similarly, the switching unit 452a is connected to the buffer 462 so as to read data elements from any one of the designated ways w0 to wQ−1 in the buffer 462.

When the instruction decoding circuit 42 decodes the scatter instruction according to this embodiment, the processor 40a communicates with the memory 30 via the memory access control circuit 45a. That is, the instruction control circuit 43a outputs the read source control signals SIG4 and SIG5 including a designated way number W (register number k) to the switching units 451a and 452a. Moreover, the instruction control circuit 43a outputs the memory write request signal SIG3 including the designated starting memory address A and the designated number of words N to the request issuing unit 450a. The instruction control circuit 43 outputs the signals SIG3 to SIG5 a number of times Q corresponding to the number of structures each time the memory access control circuit 45a receives a response to the request. In this case, the instruction control circuit 43a outputs the memory write request signal SIG3 by adding the size C to the memory address A. Moreover, the instruction control circuit 43a outputs the read source control signals SIG4 and SIG5 by adding "1" to the way number W. In other words, the instruction control circuit 43a can output the signals SIG3 to SIG5 repeatedly up to the largest number of the way number W.

Figure 11:
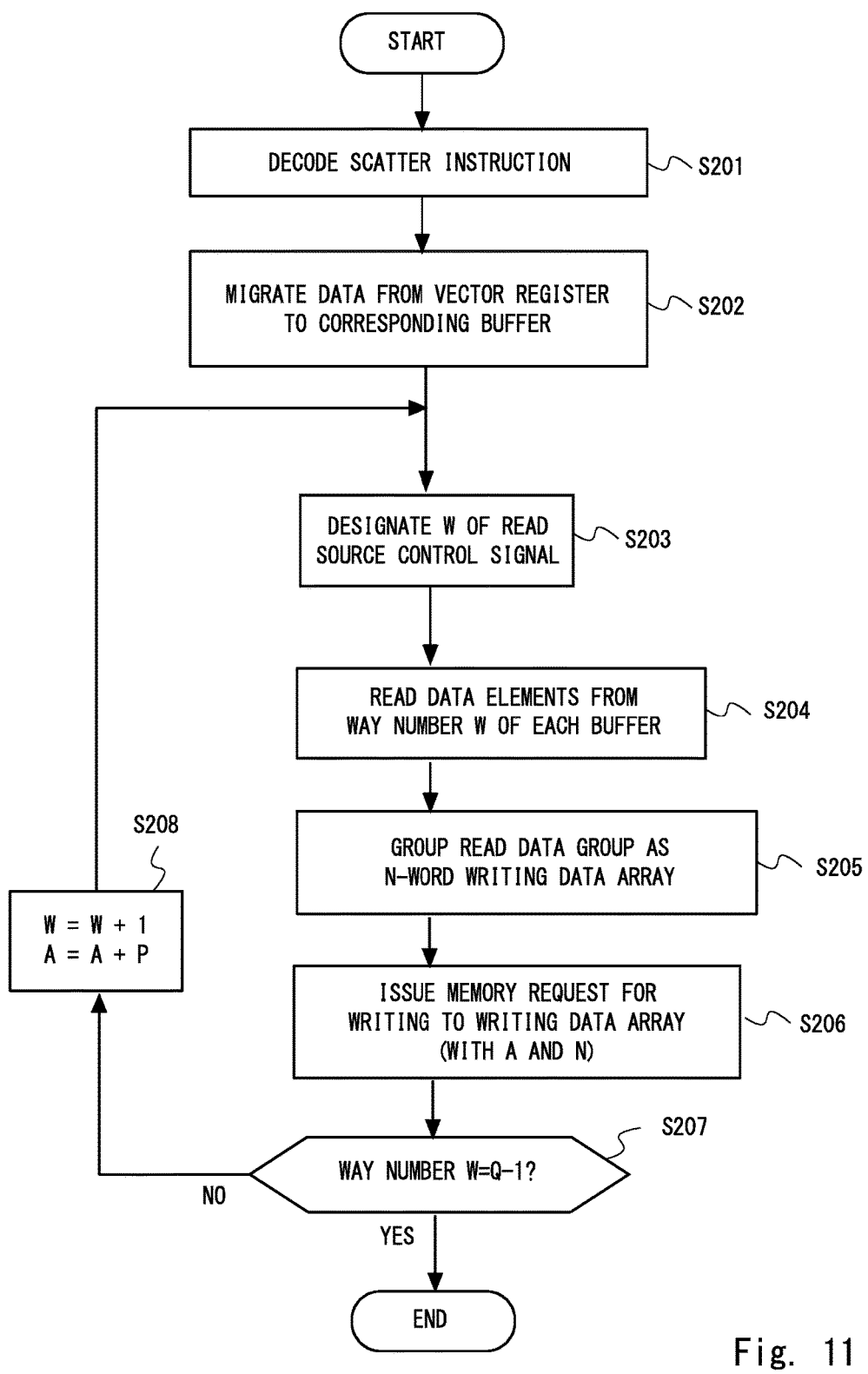
FIG. 11 is a flowchart illustrating the flow of the processes of a scatter instruction according to Embodiment 4.
Figure 12:
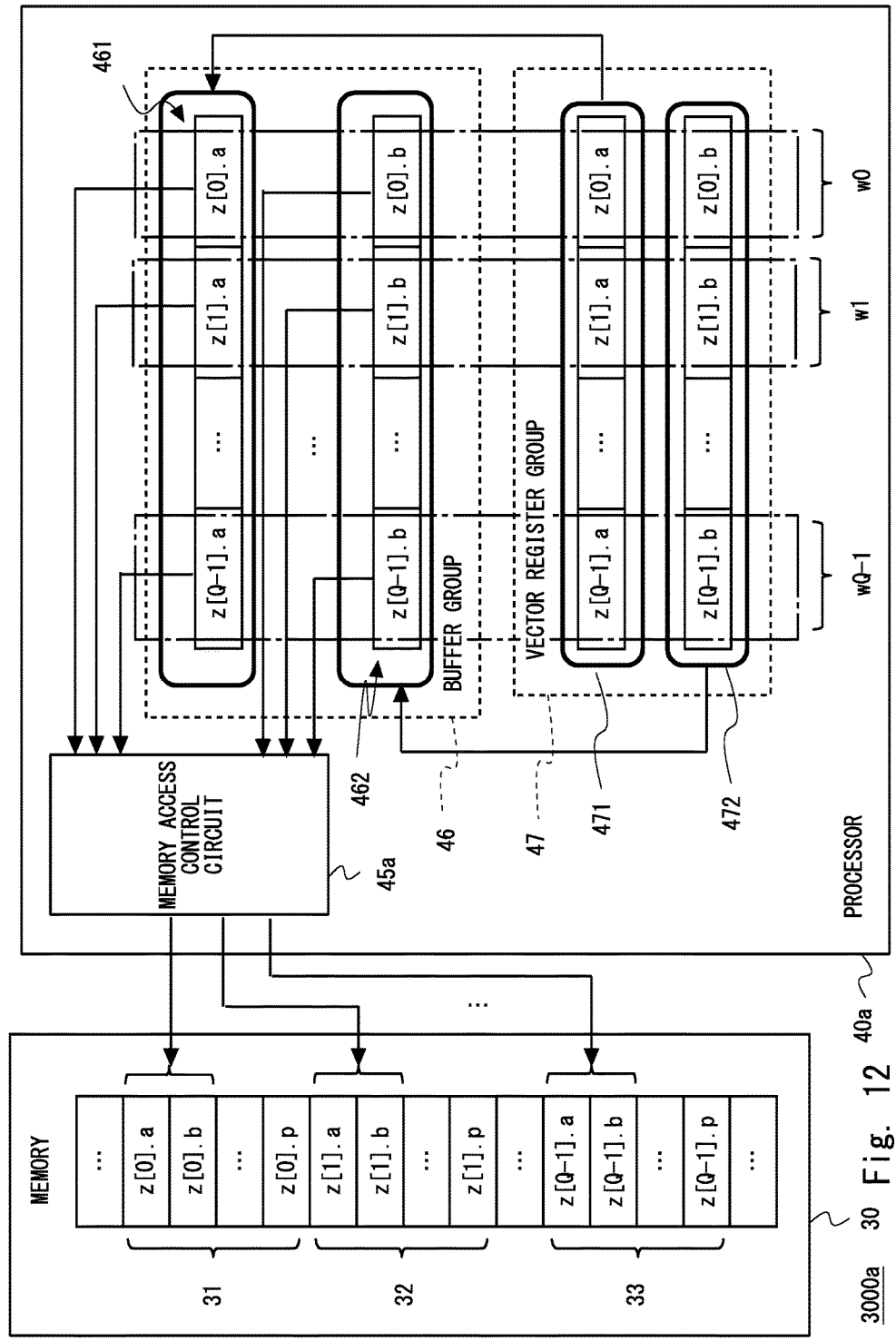
FIG. 12 is a diagram for describing the concept of the operation of a scatter instruction to a plurality of vector registers according to Embodiment 4.

FIG. 11 is a flowchart illustrating the flow of the processes of a scatter instruction according to Embodiment 4. Moreover, FIG. 12 is a diagram for describing the concept of the operation of a scatter instruction to a plurality of vector registers according to Embodiment 4. In the following description of FIG. 11, FIG. 12 is referenced appropriately.

First, it is assumed that a scatter instruction according to this embodiment is set. The instruction decoding circuit decodes the scatter instruction (S201). In response to this, the instruction control circuit 43a performs initial setting. In this initial setting, it is assumed that the starting memory address A is a storage destination address of a member variable z[0].a of the structure 31, the way number W as a register number k is "w0," the number of words N is "2," and an addition value C of the memory address is P.

Subsequently, the instruction control circuit 43a issues an instruction of migrating data elements from the respective vector registers to the corresponding buffers to the vector register group 47 (S202). In this example, a data group corresponding to one entry stored in the vector register 471 is stored in the buffer 461 and a data group corresponding to one entry stored in the vector register 472 is stored in the buffer 462 (for example, see the ways w0 to wQ−1 of the buffers 461 and 462 illustrated in FIG. 12).

Subsequently, the instruction control circuit 43a outputs the read source control signals SIG4 and SIG5 including the designated way w0 to the switching units 451a and 452a (S203). The switching units 451a and 452a read data elements from the designated way number W of the corresponding buffers (S204). In this example, the switching unit 451a reads the data value z[0].a from the way w0 of the buffer 461 designated by the read source control signal SIG4. Moreover, the switching unit 452a reads the data value z[0].b from the way w0 of the buffer 462 designated by the read source control signal SIG5.

The data grouping unit 454 groups the read data groups as a N-word writing data array (S205). In this example, the data grouping unit 454 groups the data values z[0].a and z[0].b to form a two-word writing data array.

Subsequently, the instruction control circuit 43a outputs the memory write request signal SIG3 including the designated starting memory address A and the designated number of words N to the request issuing unit 450a. In response to this, the request issuing unit 450a designates the starting memory address A and the number of words N and issues a memory access request to the memory 30 in order to write the writing data array grouped by the data grouping unit 454 (S206). In this example, the data values of z[0].a and z[0].b included in the writing data array are written to the member variables z[0].a and z[0].b of the structure 31 of the memory 30.

After that, the instruction control circuit 43a determines whether the way number W is "Q-1" (S207). In this example, since the way number W is "0," the instruction control circuit 43a adds "1" to W so that the way number becomes w1 and adds "P" to A (S208).

Subsequently, the instruction control circuit 43a executes steps S203 to S207 based on the results of step S208. That is, the instruction control circuit 43a outputs the read source control signals SIG4 and SIG5 including the designated way w1 to the switching units 451a and 452a, respectively (S203). The switching unit 451a reads the data value z[1].a from the way w1 of the buffer 461 designated by the read source control signal SIG4. Moreover, the switching unit 452a reads the data value z[1].b from the way w1 of the buffer 462 designated by the read source control signal SIG5 (S204). The data grouping unit 454 groups the data values z[1].a and z[1].b (S205). The request issuing unit 450a issues a memory access request to the memory 30 (S206). In this example, the data values of z[1].a and z[1].b included in the writing data array are written to the member variables z[1].a and z[1].b of the structure 32 of the memory 30.

After that, steps S203 to S208 are repeatedly executed until it is determined in step S207 that the way number W is Q-1". Thus, when the way number W is "Q-1," the data values of the way wQ-1 of the buffers 461 and 462 are written to the member variables z[Q-1].a and z[Q-1].b of the structure 33 of the memory 30. When it is determined in step S207 that the way number W is "Q-1," this process ends.

In this manner, by designating the read destination way in step S203, data elements can be read from the same way of N different vector registers (buffers) in step S204. The respective read data elements are grouped and are stored in the memory as N-word data.

Moreover, since the respective data elements are written to continuous areas of N words in step S206, the bandwidth of the memory can be utilized.

Further, when the results of a vector operation are stored in a structure array after the vector operation is executed, the member variables of a structure can be gathered from vector registers without using an explicit rearrangement instruction, and data elements can be stored efficiently by utilizing the memory bandwidth.

Here, the operation when a vector register has a memory bandwidth capable of accessing 64 bits (two words) simultaneously in one clock cycle and is capable of storing four words will be described as an example of this embodiment.

First, it is assumed that a member variable a of a structure array is stored in a vector register k and a member variable b of a structure array is stored in a vector register k+1. The pair of member variables a and b stored in the way w0 of the vector registers k and k+1 is stored from a memory address A to a continuous areas. Subsequently, "C" is added to the memory address A so that the address proceeds to the next structure, and then, the pair of member variables a and b stored in the way w1 of the vector registers k and k+1 is stored in continuous areas of a memory. This operation is executed for four words which is the length of the vector register.

Figure 14:
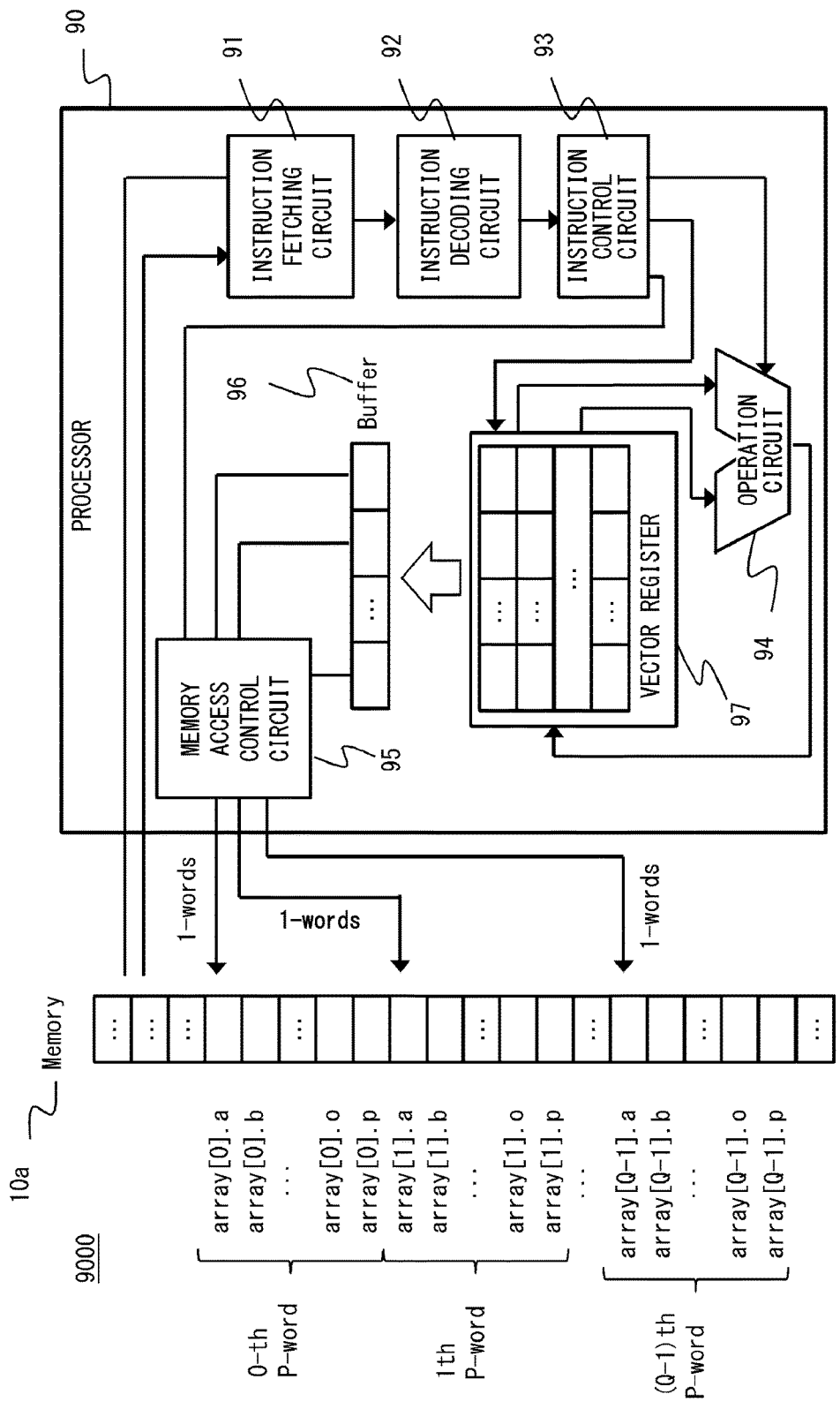
FIG. 14 is a diagram for describing the concept of a scatter instruction according to the related art.

Here, the scatter instruction according to Conventional Method 1 will be described again. FIG. 14 is a diagram for describing the concept of a scatter instruction of Conventional Method 1. When the data elements of the vector register 97 are scattered to the memory 10a, only ½ of (the memory bandwidth)×(2 words) that the hardware can provide in four clock cycles can be utilized. When the scatter instruction of Conventional Method 1 is used, two instructions are issued to load eight words of data elements, eight memory accesses (one word of data elements are discarded although two words of data elements are loaded) and two register writing operations are required.

From this respect, the scatter instruction of this embodiment is superior in that the number of memory accesses can be reduced and the memory bandwidth can be utilized effectively as compared to when the scatter instruction of Conventional Method 1 is used.

When the instruction of storing a plurality of words according to Conventional Method 2 is used, the rearrangement process is required similarly to the load instruction. Thus, as compared to Conventional Method 2, the scatter instruction of this embodiment can reduce the processing time and improve the processing efficiency since the rearrangement process is not required.

Embodiment 5

Embodiment 5 combines Embodiments 3 and 4 described above. A processor according to Embodiment 5 may include the configurations of the processors 40 and 40a of FIG. 7, for example. Moreover, a data processing device according to Embodiment 5 may include the configurations of the data processing devices 3000 and 3000a of FIG. 7, for example. That is, the processor according to Embodiment 5 can execute the gather instruction according to Embodiment 3 and the scatter instruction according to Embodiment 4. The processor according to Embodiment 5 may use the configurations common to the processors 40 and 40a.

For example, first, the processor according to Embodiment 5 gathers data elements stored in adjacent storage areas of a plurality of structures from the memory 30 according to the gather instruction according to Embodiment 3, sorts the data elements to the buffer group 46, stores the data elements in respective way units, and stores data arrays of respective member variables in the vector register group 47. In this way, a plurality of vector data elements can be gathered efficiently. The processor according to Embodiment 5 executes a vector operation using the vector register group 47 and stores the execution results in the vector register group 47. After that, the processor according to Embodiment 5 reads data elements from buffers in respective way units according to the scatter instruction according to Embodiment 4 and stores the respective data elements in adjacent areas in respective structure units. In this way, a plurality of vector data elements can be returned to the memory efficiently.

As described above, according to this embodiment, when data elements are loaded from a structure array to apply a vector operation and the data elements obtained as the result of the vector operation are stored in a structure array, memory accesses can be performed efficiently as compared to when the gather and scatter instructions of Conventional Method 1 are used and data elements are arranged in continuous areas using a memory access instruction as in Conventional Method 2.

Specifically, the gather and scatter instructions according to this embodiment can access continuous memory areas and gather and write data elements to discontinuous areas. Due to this, unlike Conventional Method 2 in which an instruction of accessing continuous memory areas is used, it is possible to apply a vector operation without performing a vector data rearrangement process. Moreover, since data access is performed on continuous areas, it is possible to effectively utilize the bandwidth without sacrificing the bandwidth unlike the gather and scatter instructions of Conventional Method 1. Therefore, in Embodiment 5, it is possible to solve the above-described problems and to efficiently perform a data load process or a data store process between a memory and a storage unit in a processor.

Other Embodiments

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), and semiconductor memories (such as mask ROM, programmable ROM (PROM), erasable PROM (EPROM), flash ROM, random access memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiment disclosed above can be described as, but not limited to, the following supplementary notes.

(Supplementary Note 1)

A processor including:

a plurality of storage units associated with a plurality of data elements included in a data set; and a control unit that reads the plurality of data elements stored in adjacent storage areas from a memory, in which a plurality of the data sets is stored, collectively for respective data sets, sorts the respective read data elements to a storage unit corresponding to the data element among the plurality of storage units, and writes the data elements to the respective data sets.

(Supplementary Note 2)

The processor according to Supplementary Note 1, wherein the control unit writes the respective read data elements so that writing positions of the data elements in sort destination storage units correspond to the respective data sets.

(Supplementary Note 3)

The processor according to Supplementary Note 2, wherein the control unit sorts the respective data elements read from the memory to any one of the plurality of storage units according to the order of the adjacent storage areas in the memory, and the control unit writes the sorted data elements to the respective sort destination storage units.

(Supplementary Note 4)

The processor according to Supplementary Note 3, wherein the control unit issues, to the memory, a request for reading the plurality of data elements from the continuous storage areas in a number corresponding to the number of a plurality of vector data elements for each data set, in response to an instruction for gathering the vector data elements, and the control unit sorts the data elements read from the memory in response to the request to any one of the plurality of storage units for each request.

(Supplementary Note 5)

The processor according to Supplementary Note 4, wherein the control unit issues the request and designates the writing position for each data set in response to the instruction for gathering the plurality of vector data elements, and the control unit writes the respective sorted data elements to the designated writing positions in the respective sort destination storage units.

(Supplementary Note 6)

The processor according to Supplementary Note 2, wherein the plurality of storage units each include a plurality of buffers corresponding to the storage areas of the respective data elements in the data set, and a plurality of registers corresponding to the buffers, the control unit designates, among the plurality of buffers, different write destination buffers for respective storage areas to sort and write the respective data elements in the designated buffer, and the control unit reads the plurality of data elements in all of the plurality of data sets, and then, writes all data elements written to each of the plurality of buffers collectively to the register corresponding to the buffer.

(Supplementary Note 7)

The processor according to Supplementary Note 2, further including:

a vector operation unit that executes a predetermined operation collectively for respective corresponding writing positions in the plurality of storage units.

(Supplementary Note 8)

The processor according to Supplementary Note 7, wherein the vector operation unit executes the predetermined operation on at least two of the plurality of storage units.

(Supplementary Note 9)

The processor according to any one of Supplementary Notes 1 to 8, wherein the plurality of data sets is a structure which uses the plurality of data elements as member variables, the plurality of storage units is associated with the member variables, and the control unit sorts and writes the respective read data elements to the plurality of storage units associated with the member variables.

(Supplementary Note 10)

A processor including:

a plurality of storage units each divided into a plurality of areas in which a plurality of data elements is stored; and a control unit that reads respective data elements stored in corresponding areas in the respective storage units, from each of the plurality of storage units, puts the read data elements together to form a data set for each of the corresponding areas, and writes the respective data elements in the data set to adjacent storage areas in a memory.

(Supplementary Note 11)

The processor according to Supplementary Note 10, wherein the control unit writes the respective read data elements so that the storage areas of the data elements in the plurality of storage units correspond to each other.

(Supplementary Note 12)

The processor according to Supplementary Note 11, wherein the control unit reads respective data elements from the corresponding areas in the plurality of storage units for each of the plurality of areas in response to an instruction for storing a plurality of vector data elements in the memory, the control unit groups the respective data elements read from the corresponding areas to form the data set for each of the plurality of areas, and the control unit issues, to the memory, a request for storing respective data elements of the grouped data set in the continuous storage areas in a number corresponding to the number of vector data elements for each of the plurality of areas.

(Supplementary Note 13)

The processor according to Supplementary Note 12, wherein the control unit issues the request and designates the area for each of the plurality of areas in response to the instruction for storing the plurality of vector data elements in the memory, and the control unit reads the respective data elements from each of the plurality of storage units using the designated area as the corresponding area.

(Supplementary Note 14)

The processor according to Supplementary Note 11, wherein the plurality of storage units each include a plurality of registers capable of reading and writing data in the entire divided area units, and a plurality of buffers which correspond to the respective registers and are capable of reading and writing data in the individual area units, the control unit reads all of the plurality of data elements stored in each of the plurality of registers and writes the data elements collectively to the respective buffers corresponding to the respective registers, the control unit reads, for each of corresponding areas in the registers, the respective data elements stored in the areas of the respective buffers, the control unit puts the read data elements together to form a writing data set for each of the corresponding areas, and the control unit writes the respective data elements in the data set to adjacent storage areas in the memory.

(Supplementary Note 15)

The processor according to Supplementary Note 11, further including:

a vector operation unit that executes a predetermined operation collectively for respective corresponding writing positions in the plurality of storage units, and writes the results of the predetermined operation to the plurality of storage units, wherein the control unit starts the reading after the vector operation unit writes the results of the predetermined operation.

(Supplementary Note 16)

A data gathering method for causing a processor to:

read first and second data elements stored in adjacent areas of a memory collectively from the memory;

write the read first data element to a first area of a first storage unit, and write the read second data element to an area of a second storage unit corresponding to the first area;

read third and fourth data elements stored in adjacent areas of the memory collectively from the memory; and write the read third data element to a second area of the first storage unit, and write the read fourth data element to an area of the second storage unit corresponding to the second area.

(Supplementary Note 17)

A data gathering method for causing a processor to:

read a first data element from a first area of a first storage unit;

read a second data element from an area of a second storage unit corresponding to the first area;

write the first and second data elements collectively to adjacent storage areas in a memory;

read a third data element from a second area of the first storage unit;

read a fourth data element from an area of the second storage unit corresponding to the second area; and write the third and fourth data elements collectively to adjacent storage areas in the memory other than the storage areas.

(Supplementary Note 18)

A data processing device including:

a memory in which a plurality of data sets is stored; and a processor including a plurality of storage units associated with a plurality of data elements included in each of the plurality of data sets, wherein the processor reads the plurality of data elements stored in adjacent storage areas collectively from the memory for each of the data sets; and the processor sorts and writes the respective read data elements to a storage unit corresponding to the data element among the plurality of storage units.

(Supplementary Note 19)

A data processing device including:

a memory; and a processor including a plurality of storage units each divided into a plurality of areas in which a plurality of data elements is stored; and a control unit that reads respective data elements stored in corresponding areas in the respective storage units, from each of the plurality of storage units, puts the read data elements together to form a data set for each of the corresponding areas, and writes the respective data elements in the data set to adjacent storage areas in a memory.

While the present invention has been described with reference to the embodiments, the present invention is not limited to the above-described embodiments and various changes can naturally be made without departing from the spirit of the present invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A processor comprising:
at least a first and a second storage device, each of the first and second storage devices including at least a first and a second storage area; and
a controller configured to communicate with a memory;
the memory configured to store in a continuous storage area of the memory at least a first and a second data element as members of a first data structure, and in another continuous storage area of the memory at least a first and a second data element as members of a second data structure,
wherein, in response to an instruction for gathering vector data elements, the controller:
issues to the memory a number of requests for reading data elements from continuous storage areas of the memory, the number corresponding to the number of vector data elements;
designates writing positions for the data elements in respective storage devices of the processor, and sorts the data elements read from the memory based on the designated writing positions,
wherein data elements of a same data structure are designated to different storage devices, and corresponding data elements of different data structures are designated to corresponding storage areas of a same storage device; and
thereby writes the first data elements of the first and second data structures to the first and second storage areas of the first storage device, respectively, and writes the second data elements of the first and second data structures to the first and second storage areas of the second storage device, respectively, and
wherein, in response to an instruction for storing a plurality of vector data elements in the memory, the controller:
reads the data element stored in the first storage area of the first storage device collectively with the data element stored in the first storage area of the second storage device and groups them together as a first data group;
reads the data element stored in the second storage area of the first storage device collectively with the data element stored in the second storage area of the second storage device and groups them together to form a second data group; and
issues to the memory requests for storing the first and second data groups in continuous storage areas of the memory.

2. The processor according to claim 1, further comprising a vector operation unit that executes a predetermined operation on at least one of the storage devices.

3. The processor according to claim 1, wherein the first and second storage devices include a plurality of registers and a plurality of buffers.

4. A processor comprising:
at least a first and a second storage device, each of the storage devices including at least a first and a second storage area; and
a controller configured to communicate with a memory, wherein the controller:
writes first and second data elements stored in the first and second storage areas of the first storage device to a first buffer;
writes first and second data elements stored in the first and second storage areas of the second storage device to a second buffer; and
writes the first data elements of the first and second buffers to a continuous storage area of the memory as members of a first data structure, and writes the second data elements of the first and second buffers to another continuous storage area of the memory as members of a second data structure,
wherein the controller is further configured to:
write the first and second data elements to the first and second storage devices,
wherein the writing of the first and second data elements to the first and second storage devices is in response to an instruction for gathering vector data elements,
wherein the controller is further configured to:
issue to the memory a number of requests for reading data elements from continuous storage areas of the memory, the memory being configured to store the data elements as members of data structures, the number corresponding to the number of vector data elements;
designate writing positions for the data elements in respective storage devices of the processor; and
sort the data elements read from the memory based on the designated writing positions,
wherein data elements of a same data structure are designated to different storage devices, and corresponding data elements of different data structures are designated to corresponding storage areas of a same storage device.

5. The processor according to claim 4, wherein, in response to an instruction for storing a plurality of vector data elements in the memory,
the controller:
reads the first and second data elements of the first and second buffers;
groups the first data elements of the first and second buffers together, and groups the second data elements of the first and second buffers together; and
issues to the memory requests for storing the grouped first data elements and the grouped second data elements in continuous storage areas of the memory.

6. The processor according to claim 4, further comprising:
a vector operation unit that:
executes a predetermined operation on at least one of the storage devices; and
writes a result of the predetermined operation to at least one of the storage devices,
wherein the controller starts the writing after the vector operation unit writes the result of the predetermined operation.

7. The processor according to claim 4, wherein the first and second storage devices include a plurality of registers and a plurality of buffers.

* * * * *